United States Patent
Allen et al.

(10) Patent No.: US 7,620,212 B1
(45) Date of Patent: Nov. 17, 2009

(54) ELECTRO-OPTICAL SENSOR

(75) Inventors: Jeffrey G. Allen, Albuquerque, NM (US); Stephen P. Corcoran, Corrales, NM (US); David M. Gabel, Albuquerque, NM (US); Damien M. Gonzales, Albuquerque, NM (US); Robert M. Harbour, Santa Fe, NM (US); Shonn P. Hendee, Albuquerque, NM (US); Kristin A. Nixon, Albuquerque, NM (US); Robert E. Ostrom, Albuquerque, NM (US); Robert K. Rowe, Corrales, NM (US); Timothy Rowe, Cambridge, MA (US)

(73) Assignee: Lumidigm, Inc., Albuquerque, NM (US)

( * ) Notice: Subject to any disclaimer, the term of this patent is extended or adjusted under 35 U.S.C. 154(b) by 963 days.

(21) Appl. No.: 10/640,503

(22) Filed: Aug. 12, 2003

Related U.S. Application Data

(60) Provisional application No. 60/460,247, filed on Apr. 4, 2003, provisional application No. 60/403,453, filed on Aug. 13, 2002, provisional application No. 60/403,452, filed on Aug. 13, 2002, provisional application No. 60/403,593, filed on Aug. 13, 2002, provisional application No. 60/403,461, filed on Aug. 13, 2002, provisional application No. 60/403,449, filed on Aug. 13, 2002.

(51) Int. Cl.
*G06K 9/00* (2006.01)

(52) U.S. Cl. .................. 382/115; 340/5.53; 340/5.83; 713/186

(58) Field of Classification Search ......... 382/115–127; 340/5.1, 5.2, 5.52, 5.53, 5.8–5.86; 902/3; 356/71; 713/186
See application file for complete search history.

(56) References Cited

U.S. PATENT DOCUMENTS

| 3,508,830 | A | 4/1970 | Hopkins el al. |
| 3,910,701 | A | 10/1975 | Henderson et al. |
| RE29,008 | E | 10/1976 | Ott |
| 4,035,083 | A | 7/1977 | Woodriff et al. |

(Continued)

FOREIGN PATENT DOCUMENTS

EP     0 280 418 A1     8/1988

(Continued)

OTHER PUBLICATIONS

Zavala, Albert & Paley, James J. "Using fingerprint measures to predict other anthropometric Variables" Human Factors, 1975, pp. 591-602, vol. 17, No. 6.

(Continued)

*Primary Examiner*—Aaron W Carter
(74) *Attorney, Agent, or Firm*—Townsend, Townsend & Crew LLP

(57) ABSTRACT

Methods and systems are provided that extend the functionality of electro-optical sensors. A device has a multiple light sources, a light detector, and a processor configured to operate the light sources and the light detector to perform distinct functions. At least one of the distinct functions includes a biometric identification function in which light is propagated from the plurality of light sources through presented material. The propagated light is received with the light detector, with the presented material being identified from the received light. Another of the distinct functions includes a nonidentification function performed with the light sources and the light detector.

19 Claims, 16 Drawing Sheets

U.S. PATENT DOCUMENTS

| | | |
|---|---|---|
| 4,142,797 A | 3/1979 | Astheimer |
| 4,169,676 A | 10/1979 | Kaiser |
| 4,260,220 A | 4/1981 | Whitehead |
| 4,427,889 A | 1/1984 | Muller |
| 4,537,484 A | 8/1985 | Fowler |
| 4,598,715 A | 7/1986 | Machler et al. |
| 4,653,880 A | 3/1987 | Sting et al. |
| 4,654,530 A | 3/1987 | Dybwad |
| 4,655,225 A | 4/1987 | Dahne et al. |
| 4,656,562 A | 4/1987 | Sugino |
| 4,657,397 A | 4/1987 | Oehler et al. |
| 4,661,706 A | 4/1987 | Messerschmidt et al. |
| 4,684,255 A | 8/1987 | Ford |
| 4,712,912 A | 12/1987 | Messerschmidt |
| 4,730,882 A | 3/1988 | Messerschmidt |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,068,536 A | 11/1991 | Rosenthal |
| 5,070,874 A | 12/1991 | Barnes et al. |
| 5,158,082 A | 10/1992 | Jones |
| 5,163,094 A | 11/1992 | Prokoski et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong et al. |
| 5,552,997 A | 9/1996 | Massart |
| 5,559,504 A | 9/1996 | Itsumi et al. |
| 5,596,992 A | 1/1997 | Haaland et al. |
| 5,606,164 A | 2/1997 | Price et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladnev et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Andersen et al. |
| 5,935,062 A | 8/1999 | Messerschmidt et al. |
| 5,945,676 A | 8/1999 | Khalil |
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |

| | | | |
|---|---|---|---|
| 6,044,285 A | 3/2000 | Chaiken et al. | |
| 6,045,502 A | 4/2000 | Eppstein et al. | |
| 6,046,808 A | 4/2000 | Fately | |
| 6,049,727 A | 4/2000 | Crothall | |
| 6,056,738 A | 5/2000 | Marchitto et al. | |
| 6,057,925 A | 5/2000 | Anthon | |
| 6,061,581 A | 5/2000 | Alam et al. | |
| 6,061,582 A | 5/2000 | Small et al. | |
| 6,066,847 A | 5/2000 | Rosenthal | |
| 6,069,689 A | 5/2000 | Zeng et al. | |
| 6,070,093 A | 5/2000 | Oosta et al. | |
| 6,073,037 A | 6/2000 | Alam et al. | |
| 6,088,605 A | 7/2000 | Griffith et al. | |
| 6,088,607 A | 7/2000 | Diab et al. | |
| 6,097,035 A | 8/2000 | Belongie et al. | |
| 6,100,811 A | 8/2000 | Hsu et al. | |
| 6,115,484 A | 9/2000 | Bowker et al. | |
| 6,115,673 A | 9/2000 | Malin et al. | |
| 6,122,042 A | 9/2000 | Wunderman et al. | |
| 6,122,394 A | 9/2000 | Neukermans et al. | |
| 6,122,737 A | 9/2000 | Bjorn et al. | |
| 6,125,192 A | 9/2000 | Bjorn et al. | |
| 6,141,101 A | 10/2000 | Bleier et al. | |
| 6,147,749 A | 11/2000 | Kubo et al. | |
| 6,148,094 A | 11/2000 | Kinsella | |
| 6,152,876 A | 11/2000 | Robinson et al. | |
| 6,154,658 A | 11/2000 | Caci | |
| 6,157,041 A | 12/2000 | Thomas et al. | |
| 6,159,147 A | 12/2000 | Lichter et al. | |
| 6,172,743 B1 | 1/2001 | Kley et al. | |
| 6,175,407 B1 | 1/2001 | Sartor | |
| 6,181,414 B1 | 1/2001 | Raz et al. | |
| 6,181,958 B1 | 1/2001 | Steuer et al. | |
| 6,188,781 B1 | 2/2001 | Brownlee | |
| 6,212,424 B1 | 4/2001 | Robinson | |
| 6,226,541 B1 | 5/2001 | Eppstein et al. | |
| 6,229,908 B1 * | 5/2001 | Edmonds et al. | 382/124 |
| 6,230,034 B1 | 5/2001 | Messerschmidt et al. | |
| 6,230,126 B1 * | 5/2001 | Kuroda | 704/231 |
| 6,240,306 B1 | 5/2001 | Rohrscheib et al. | |
| 6,240,309 B1 | 5/2001 | Yamashita et al. | |
| 6,241,663 B1 | 6/2001 | Wu et al. | |
| 6,256,523 B1 | 7/2001 | Diab et al. | |
| 6,272,367 B1 | 8/2001 | Chance | |
| 6,280,381 B1 | 8/2001 | Malin et al. | |
| 6,282,303 B1 | 8/2001 | Brownlee | |
| 6,285,895 B1 | 9/2001 | Ristolainen et al. | |
| 6,292,576 B1 | 9/2001 | Brownlee | |
| 6,301,815 B1 | 10/2001 | Sliwa | |
| 6,304,767 B1 | 10/2001 | Soller et al. | |
| 6,307,633 B1 | 10/2001 | Mandella et al. | |
| 6,309,884 B1 | 10/2001 | Cooper et al. | |
| 6,317,507 B1 | 11/2001 | Dolfing et al. | |
| 6,324,310 B1 | 11/2001 | Brownlee | |
| 6,330,346 B1 | 12/2001 | Peterson et al. | |
| 6,404,904 B1 | 6/2002 | Einighammer et al. | |
| 6,419,361 B2 | 7/2002 | Cabib et al. | |
| 6,483,929 B1 | 11/2002 | Murakami et al. | |
| 6,504,614 B1 | 1/2003 | Messerschmidt et al. | |
| 6,560,352 B2 | 5/2003 | Rowe et al. | |
| 6,574,490 B2 | 6/2003 | Abbink et al. | |
| 6,628,809 B1 | 9/2003 | Rowe et al. | |
| 6,668,071 B1 * | 12/2003 | Minkin et al. | 382/124 |
| 6,741,729 B2 | 5/2004 | Bjorn et al. | |
| 6,799,275 B1 | 9/2004 | Bjorn | |
| 6,813,010 B2 * | 11/2004 | Kono et al. | 356/71 |
| 6,816,605 B2 | 11/2004 | Rowe et al. | |
| 6,829,375 B1 * | 12/2004 | Higuchi | 382/124 |
| 2002/0101566 A1 | 8/2002 | Elsner et al. | |
| 2002/0145507 A1 * | 10/2002 | Foster | 340/5.53 |
| 2002/0171834 A1 | 11/2002 | Rowe et al. | |
| 2002/0183624 A1 | 12/2002 | Rowe et al. | |
| 2003/0016345 A1 * | 1/2003 | Nagasaka et al. | 356/71 |
| 2003/0078504 A1 | 4/2003 | Rowe et al. | |
| 2003/0095525 A1 * | 5/2003 | Lavin et al. | 370/338 |
| 2004/0047493 A1 | 3/2004 | Rowe et al. | |
| 2004/0240712 A1 | 12/2004 | Rowe et al. | |
| 2005/0007582 A1 | 1/2005 | Villers et al. | |
| 2005/0205667 A1 | 9/2005 | Rowe | |
| 2006/0002597 A1 | 1/2006 | Rowe | |
| 2006/0002598 A1 | 1/2006 | Rowe et al. | |

FOREIGN PATENT DOCUMENTS

| | | |
|---|---|---|
| EP | 0 426 358 B1 | 5/1991 |
| EP | 0 449 335 A2 | 10/1991 |
| EP | 0 573 137 A2 | 12/1993 |
| EP | 0 631 137 A2 | 12/1994 |
| EP | 0 670 143 A1 | 9/1995 |
| EP | 0 681 166 A1 | 11/1995 |
| EP | 0 757 243 A1 | 2/1997 |
| EP | 0 788 000 A2 | 8/1997 |
| EP | 0 801 297 A1 | 10/1997 |
| EP | 0 836 083 A1 | 4/1998 |
| EP | 0 843 986 A2 | 5/1998 |
| EP | 0 869 348 A2 | 10/1998 |
| EP | 0 897 164 A2 | 2/1999 |
| EP | 0 897 691 A2 | 2/1999 |
| EP | 0 317 121 B1 | 5/1999 |
| EP | 0 924 656 A2 | 6/1999 |
| EP | 0 982 583 A1 | 3/2000 |
| EP | 0 990 945 A1 | 4/2000 |
| WO | WO 92/00513 A1 | 1/1992 |
| WO | WO 92/17765 A1 | 10/1992 |
| WO | WO 93/00855 A1 | 1/1993 |
| WO | WO 93/07801 A1 | 4/1993 |
| WO | WO 95/22046 A1 | 8/1995 |
| WO | WO 97/23159 A1 | 7/1997 |
| WO | WO 97/27800 A1 | 8/1997 |
| WO | WO 97/28437 A1 | 8/1997 |
| WO | WO 97/28438 A1 | 8/1997 |
| WO | WO 98/01071 A1 | 1/1998 |
| WO | WO 98/37805 A1 | 9/1998 |
| WO | WO 98/40723 A1 | 9/1998 |
| WO | WO 99/09395 A1 | 2/1999 |
| WO | WO 01/15596 A1 | 3/1999 |
| WO | WO 99/37203 A2 | 7/1999 |
| WO | WO 99/43255 A1 | 9/1999 |
| WO | WO 99/46731 A1 | 9/1999 |
| WO | WO 99/55222 A1 | 11/1999 |
| WO | WO 99/56616 A1 | 11/1999 |
| WO | WO 01/18332 A1 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 02/084605 A2 | 10/2002 |
| WO | WO 02/099393 A2 | 12/2002 |
| WO | WO 2004/068388 A2 | 8/2004 |
| WO | WO 2004/068394 A1 | 8/2004 |

OTHER PUBLICATIONS

Demos, S. G. et al., "Optical Fingerprinting Using Polarisation Contrast Improvement," Electronics Letters, vol. 33, No. 7, pp. 582-584, Mar. 27, 1997.

Marbach, Ralf, "Measurement Techniques for IR Spectroscopic Blood Glucose Determination," Fortschritt Bericht, Series 8: Measurement And Control Technology, No. 346, pp. cover and 1-158, Mar. 28, 1994.

Bantle, John P. at al., "Glucose Measurement in Patients with Diabetes Mellitus with Dermal Interstitial Fluid," Copyright © 1997 by Mosby-Year Book, Inc., 9 pages.

Berkoben et al., "Vascular Access for Hemodialysis", *Clinical Dialysis*, published on or before Oct. 30, 1997, 20 pages.

Bleyer et al., 'The costs of Hospitalizations Due to Hemodialysis Access Management', *Nephrology News & Issues*, Jan. 1995, pp. 19, 20 and 22.

Daugirdas at al., "Comparison of Methods to Predict the Equilibrated Kt/V (eKt/V) in the Hemo Study", National Institutes of Health, NIDDK, Bethesda, MD. Aug. 20, 1996.

Depner at al., "Clinical Measurement of Blood Flow in Hemodialysis Access Fistulae and Grafts by Ultrasound Dilution", from the Department of Nephrology, University of California, published bon or before Oct. 30. 1997, 4 pages.

Hakim et al., "Effects of Dose of Dialysis on Morbidity and Mortality", *American Journal of Kidney Diseases*, Vol. 23, No. 5, May 1994, pp. 661-669.

Jacobs, et al., "A Disposable Urea Sensor for Continuous Monitoring of Hemodialysis Efficiency", USAIO Journal, 1993. pp. M353-M358.

Keshaviah et al., "On-line monitoring of the delivery of the hemodialysis prescription", *Pediatric Nephrology*, vol. 9, 1995, pp. S2-S8.

Krivitski, "Theory and Validation of Access Flow Measurement by Dilution Technique During Hemodialysis", *Kidney International*, vol. 48, 1995, pp. 244-250.

Marbach, R. et al. "Optical Diffuse Reflectance Accessory for Measurements of Skin Tissue by Near-Infrared Spectroscopy," Applied Optics, vol. 34, No. 4, Feb. 1, 1995, pp. 610-621.

Mardia, K.V. at al., Multivariate Analysis, Academic Press (1979) pp. 300-325.

Nichols, et al., "Design and Testing of a White-Light, Steady-State Diffuse Reflectance Spectrometer for Determination of Optical Properties of Highly Scattering Systems," Applied Optics. 1 Jan. 1997. 36(1), pp. 93-104.

Ripley, B.D., *Pattern Recognition and Neural Networks*, Cambridge University Press (1996) pp. 91-120.

Ronco at al., "On-line urea monitoring: a further step towards adequate dialysis prescription and delivery", *Int'l. Journal of Artificial Organs*, vol. 18, No. 9, 1995, pp. 534-543.

Service, F. John et at., "Dermal Interstitial Glucose as an Indicator of Ambient Glycemia," *Diabetes Care*, vol. 20, No. 9, Sep. 1997, 9 pages.

Sherman, "Recirculation in the Hemodialysis Access", *Principles and Practice of Dialysis*, published on or before Oct. 30, 1997, 9 pages.

Sherman, "The Measurement of Dialysis Access Recirculation", *American Journal of Kidney Diseases*, vol. 22, No. 4, Oct. 1993, pp. 616-621.

Steuer et al., "A New Optical Technique for Monitoring Hematocrit and Circulating Blood Volume: Its Application in Renal Dialysis", *Dialysis & Transplantation*, vol. 22, No. 5, May 1993, 5 pages.

Webb, Paul, "Temperatures of Skin, Subcutaneous Tissue, Muscle and Core in Resting Men in Cold, Comfortable and Hot Conditions," *European Journal of Applied Physiology*, vol. 64 (1992) pp. 471-476.

Brochure entitled "Determination of Delivered Therapy Through Measurement of Effective Clearance", Feresenius USA, Dec. 1994, 1 page.

U.S. Appl. No. 11/115,075, Office Action, 26 pages, Nov. 13, 2006.
U.S. Appl. No. 11/115,075, Office Action, 9 pages, May 1, 2007.
U.S. Appl. No. 11/115,075, Office Action, 7 pages, Aug. 31, 2007.
U.S. Appl. No. 11/115,075, Office Action, 9 pages, Feb. 1, 2008.
U.S. Appl. No. 11/115,075, Advisory Action, 3 pages, Apr. 24, 2008.
U.S. Appl. No. 11/115,100, Office Action, 30 pages, Nov. 14, 2006.
U.S. Appl. No. 11/115,100, Office Action, 10 pages, May 1, 2007.
U.S. Appl. No. 11/115,100, Office Action, 9 pages, Aug. 9, 2007.
U.S. Appl. No. 11/115,101, Office Action, 24 pages, Dec. 13, 2006.
U.S. Appl. No. 11/115,101, Office Action, 17 pages, May 9, 2007.

* cited by examiner

ELECTRO-OPTICAL SENSOR

CROSS-REFERENCES TO RELATED APPLICATIONS

This application is a nonprovisional of and claims the benefit of the filing date of each of the following provisional applications under 35 U.S.C. § 119(e): U.S. Prov. Pat. Appl. No. 60/403,453, entitled "BIOMETRIC ENROLLMENT SYSTEMS AND METHODS," filed Aug. 13, 2002 by Robert K. Rowe et al.; U.S. Prov. Pat. Appl. No. 60/403,452, entitled "BIOMETRIC CALIBRATION AND DATA ACQUISITION SYSTEMS AND METHODS," filed Aug. 13, 2002 by Robert K. Rowe et al.; U.S. Prov. Pat. Appl. No. 60/403,593, entitled "BIOMETRIC SENSORS ON PORTABLE ELECTRONIC DEVICES," filed Aug. 13, 2002 by Robert K. Rowe et al.; U.S. Prov. Pat. Appl. No. 60/403,461, entitled "ULTRA-HIGH-SECURITY IDENTIFICATION SYSTEMS AND METHODS," filed Aug. 13, 2002 by Robert K. Rowe et al.; U.S. Prov. Pat. Appl. No. 60/403,449, entitled "MULTIFUNCTION BIOMETRIC DEVICES," filed Aug. 13, 2002 by Robert K. Rowe et al; and U.S. Prov. Pat. Appl. No. 60/460,247, entitled "NONINVASIVE ALCOHOL MONITOR," filed Apr. 4, 2003 by Robert K. Rowe et al. The entire disclosure of each of these six provisional applications is incorporated herein by reference for all purposes.

This application is also related to the following commonly assigned applications and patents, the entire disclosure of each of which is incorporated herein by reference for all purposes: U.S. Pat. No. 6,560,352, entitled "APPARATUS AND METHOD OF BIOMETRIC IDENTIFICATION OR VERIFICATION OF INDIVIDUALS USING OPTICAL SPECTROSCOPY," filed Apr. 11, 2001 by Robert K. Row. et al.; U.S. patent application Ser. No. 09/415,594, entitled "APPARATUS AND METHOD FOR IDENTIFICATION OF INDIVIDUALS BY NEAR-INFRARED SPECTRUM," filed Oct. 8, 1999; U.S. patent application Ser. No. 09/874,740, entitled "APPARATUS AND METHOD OF BIOMETRIC DETERMINATION USING SPECIALIZED OPTICAL SPECTROSCOPY SYSTEM," filed Jun. 5, 2001; U.S. patent application Ser. No. 10/262,403, entitled "SPECTROSCOPIC CROSS-CHANNEL METHOD AND APPARATUS FOR IMPROVED OPTICAL MEASUREMENTS OF TISSUE," filed Sep. 30, 2002 by Robert K. Rowe et al.; and U.S. patent application Ser. No. 10/407,589, entitled "METHODS AND SYSTEMS FOR BIOMETRIC IDENTIFICATION OF INDIVIDUALS USING LINEAR OPTICAL SPECTROSCOPY," filed Apr. 3, 2003 by Robert K. Rowe et al.

BACKGROUND OF THE INVENTION

This application relates generally to electro-optical sensors. More specifically, this application relates to electro-optical sensors for use in biometric analysis of optical spectra of tissue.

Biometric determination is generally defined as the process of measuring and using one or more physical or behavioral features or attributes to gain information about identity, age, or sex of a person, animal, or other biological entity. As well, in order to ensure security, the biometric determination task may include further tasks that ensure that the sample being measured is authentic and being measured on a living being. This latter test is referred to as a determination of liveness.

There are two common modes in which biometric determinations of identity occur: one-to-many (identification) and one-to-one (verification). One-to-many identification attempts to answer the question of, "do I know you?" The biometric measurement device collects a set of biometric data and from this information alone it assesses whether the person is a previously seen ("authorized") individual. Systems that perform the one-to-many identification task, such as the FBI's Automatic Fingerprint Identification System (AFIS), are generally very expensive ($10 million or more) and require many minutes to detect a match between an unknown sample and a large database containing hundreds of thousands or millions of entries. The one-to-one mode of biometric analysis answers the question of, "are you who you say you are?" This mode is used in cases where an individual makes a claim of identity using a user name, a personal identification number (PIN) or other code, a magnetic card, or other means, and the device collects a set of biometric data which it uses to confirm the identity of the person. "Identification" will be used in this document to denote both identification and verification tasks.

Although in general the one-to-many identification task is more difficult than one-to-one, the two tasks become the same as the number of recognized or authorized users for a given biometric device decreases to just a single individual. Situations in which a biometric identification task has only a small number of entries in the authorization database are quite common. For example, biometric access to a residence, to a personal automobile, to a personal computer, to a cellular telephone, and to other such personal devices typically require an authorization database of just a few people.

Biometric identification and verification is useful in many applications. Examples include verifying identity prior to activating machinery or gaining entry to a secure area. Another example would be identification of an individual for matching that individual to records on file for that individual, such as for matching hospital patient records especially when the individual's identity is unknown. Biometric identification is also useful to match police records at the time a suspect is apprehended, but true identity of the suspect is not known. Additional uses of biometric identification or verification include automotive keyless start and entry applications, secure computer and network access applications, automated financial transaction applications, authorized handgun use applications, and time-and-attendance applications. In general, protected property will be the term used to describe all of the goods, places, services, and information that may require biometric authorization to access.

In addition to performing a biometric identification or verification and ensuring that the sample being measured is living tissue, there may also exist a need to determine an estimate of the age, sex, and other demographic characteristics of the person under test as part of the biometric determination task. For example, the U.S. Federal Trade Commission recently established a commission to examine the issue of remotely determining age of a person who is attempting to access a web site in order to block access by children to inappropriate sites. The Commission on Online Child Protection (COPA) heard testimony on Jun. 9, 2000 that indicated that then-known biometric techniques could not be used to aid the determination of a person's age based on any known biometric features.

BRIEF SUMMARY OF THE INVENTION

Embodiments of the invention thus provide methods and systems that extend the functionality of electro-optical sensors. In a first set of embodiments, a device is provided having such extended functionality. The device includes a plurality of light sources, a light detector, and a processor configured to operate the light sources and the light detector to perform a plurality of distinct functions. At least one of the distinct functions comprises a biometric identification function in which light is propagated from the plurality of light sources through presented material. The propagated light is received with the light detector, with the presented material being identified from the received light. Another of the distinct functions comprises a nonidentification function performed with the light sources and the light detector.

In some of these embodiments, the light detector may comprise a plurality of light detectors, which may further comprise an array of light detectors. In one embodiment, the nonidentification function comprises a liveness function to determine whether the presented material is alive. Such a determination may be used in some instances as part of providing operation of an optical switch having multistate functionality. In another embodiment, the nonidentification function comprises a nonbiometric function. For example, the nonidentification function may comprise operation of an optical communications port with the light sources and the light detector.

In a second set of embodiments, a portable electronic device having extended functionality is provided. The portable electronic device comprises an electronic arrangement for performing a standard function of the portable electronic device, a biometric sensor, and a processor. The biometric sensor includes a plurality of light sources and a light detector disposed relative to the light sources to detect light from the light sources that has propagated through tissue. The processor is configured to operate the electronic arrangement to perform the standard function and to operate the biometric sensor. Light is propagated from the plurality of light sources through the tissue and the propagated light is received with the light detector. The tissue is identified from the received light.

Examples of functions that may be performed by the electronic arrangement include functions of a cellular telephone, a personal digital assistant, an electronic fob, and a watch. In some instances, the processor may be further configured to operate the biometric sensor to perform a nonbiometric function. For example, the biometric sensor may be operated to perform a spectrometer function, such as a stress-detection function, a lie-detector function, a tanning-meter function, a complexion-monitor function, a toxicity-monitor function, an alcohol-monitor function, a bilirubin-monitor function, a hemoglobin-monitor function, a fruit-ripeness-monitor function, a counterfeit-document detection function, or a color-match function. In other instances, the nonbiometric function may use an illumination capacity of the plurality of light sources and use a detection capacity of the light detector, such as in performing an ambient-light-sensor function, an entertainment function, a personal-security function, a smoke-detector function, a motion-detection function, or an optical-strobe function. In some embodiments, the nonbiometric function may use an illumination capacity of the plurality of light sources, such as to provide an optical-ringer function, a flashlight function, or an optical-pointer function. In other embodiments, the nonbiometric function may use a detection capacity of the light detector, such as to provide a trickle-charge function or a light-meter function.

In a third set of embodiments, a method is provided for managing enrollment in a biometric identification system that accommodates extended functionality. A database is maintained that comprises spectrally derived biometric identification information for at least one individual and an identification of personalized settings for the at least one individual. Collected spectral data are correlated with the spectrally derived biometric identification information for the at least one individual. Parameters of an object are adjusted in accordance with the personalized settings. The at least one individual may comprise a plurality of individuals. In some instances, changes to the parameters made by the at least one individual may be tracked so that the personalized settings may be modified in accordance with the changes.

In a fourth set of embodiments, a method is provided for identifying a physiological state of an individual. Electromagnetic radiation is propagated into tissue of the individual. A measured spectral variation is received in the form of electromagnetic radiation scattered from the tissue of the individual. The measured spectral variation is compared with a reference spectral variation over a predetermined wavelength interval by comparing, at each of a plurality of wavelengths within the predetermined wavelength interval, a property of the measured and reference spectral variations. The physiological state of the individual is determined from a consistency of the measured spectral variation with the reference spectral variation.

In some embodiments, the physiological state may indicate a stress level of the individual, while in other embodiments, the physiological state may indicate a level of truthfulness of a statement made by the individual. The measured and reference spectral variations may be acquired substantially contemporaneously, such as in a common session. In other instances, the physiological state may indicate a concentration of a substance in the tissue of the individual, such as a concentration of alcohol, bilirubin, or hemoglobin, among others.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

1. Introduction

Figure 1:
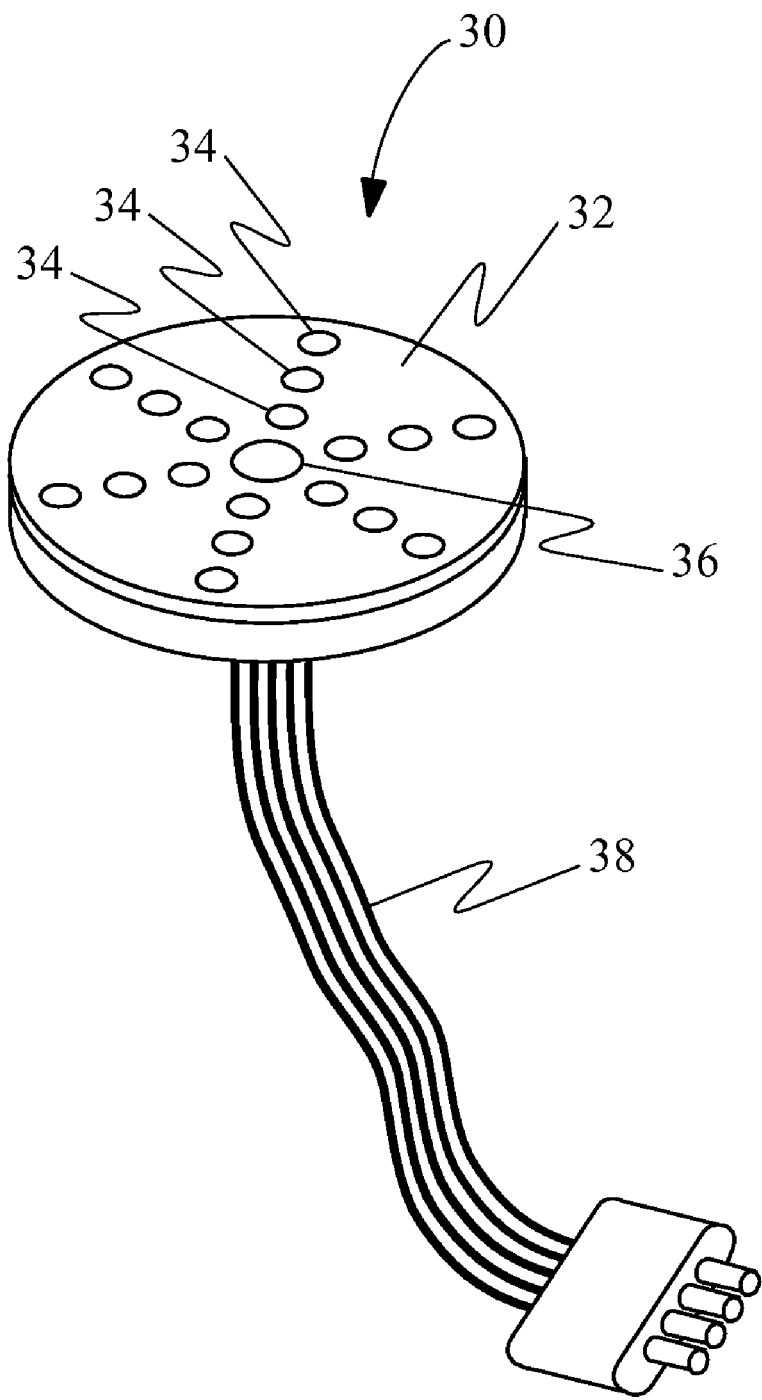
FIG. 1 provides a perspective view of a spectral biometric sensor used in embodiments of the invention.

Embodiments of the invention are based on the recognition that an accurate, precise, and repeatable tissue spectrum of an individual in certain electromagnetic wavelength ranges contain spectral features and combinations of spectral features that are unique to the individual. In some embodiments, the wavelength ranges comprise the ultraviolet, visible, very-near-infrared, or near-infrared ranges, or combinations of these ranges. In addition, embodiments of the invention recognize that analysis, such as with discriminant-analysis techniques, can identify these unique features or combinations, which may not be readily apparent in visual analysis of a spectral output, so that an individual's identity may be determined by comparison of tissue spectral data taken at the time of use and compared to stored tissue spectral data from prior measurement.

In addition, the tissue spectrum has been found not only to contain information that is unique to an individual, but also to contain numerous features and combinations of features that indicate whether such spectral samples were taken while the sample was alive or not. The physiological effects that give rise to spectral features that indicate the "liveness" state of a sample, i.e. whether it is alive or dead, include, but are not limited to blood perfusion, temperature, hydration status, glucose and other analyte levels, and overall state of tissue decay. Thus, the biometric identification and verification methods of the present invention may also be used in conjunction with, or separately from, the determination of the state of the liveness of the tissue. Tissue from other biological systems, such as organs, animals, etc., has also been found to have spectral characteristics that are distinctly different from human skin due to differences in the tissue composition and form. Thus, the biometric identification methods of the present invention may also be used in conjunction with or separately from the determination of whether the sample is human skin or some other tissue. In addition, it has been found that tissue-like substances such as collagen gelatin, latex, water solutions, or others that have been used to attempt to spoof various biometric sensors have spectral characteristics that are distinctly different that human tissue due to differences in composition and form. The biometric identification and verification methods of the present invention can thus be used with or separately from the determination whether the sample is actual tissue or some other substance.

The inventors have also found that other spectral features observed in the tissue spectrum relate to the age and sex of the person being measured. It is believed that these features are due in part to the differences in dermal thickness between young and old people and between males and females. Such changes in skin thickness and composition affect the optical characteristics of the tissue by affecting the scattering properties of the sample. These properties in turn impose distinct spectral shapes on the measured tissue spectra, which can be extracted and used by appropriate multivariate techniques to provide age and sex estimates.

2. Optical Devices

Referring now to FIG. 1, a perspective view of an embodiment of a typical optical sensor head in one embodiment is shown. The sensor assembly 30 comprises a plurality of light sources 34 arranged in a selected manner on a sensor head 32, which also contains one or more detectors 36. The sensor assembly 30 may also include power conditioning electronics (not shown) that supply power to the light sources 34 and may also include signal processing electronics (not shown) that amplify the resulting signal from the detector 36. A multiconductor cable 38 provides a means to power the sensor head and to transmit the detected signal back to a microprocessor or computer (not shown) that processes the spectral data. Alternatively, the power and/or signals to and from the sensor head can be achieved by a direct connection to the supporting electronics or through a variety of electrical interconnects such as PC boards, backplanes, wirebonds, IC connectors, as well as a variety of wireless connections including RF and optical.

The light sources 34 may comprise light emitting diodes ("LEDs"), laser diodes, vertical cavity surface emitting lasers ("VCSELs"), quartz tungsten halogen incandescent bulbs with optical pass-band filters which may optionally include optical shutters, or any of a variety of other optical sources known in the art. The light sources 34 can each have the same wavelength characteristics or can be comprised of sources with different center wavelengths in a spectral range from about 300 nm to about 10,000 nm. In general, the collection of light sources 34 can include some sources that have the same wavelengths as others and some sources that are different. In one embodiment, the light sources 34 includes sets of LEDs, laser diodes, VCSELs, or other solid-state optoelectronic devices with differing wavelength characteristics that lie within the spectral range from about 350 nm to about 1100 nm.

The detector 36 may comprise a single element, a plurality of discrete elements, or a one- or two-dimensional array of elements. The detector type and material is chosen to be appropriate to the source wavelengths and the measurement signal and timing requirements. These detectors can include PbS, PbSe, InSb, InGaAs, MCT, bolometers and micro-bolometer arrays. In one embodiment where the light sources 34 are solid-state optoelectronic devices operating in the spectral range from about 350 nm to about 1100 nm, a suitable detector material is silicon.

The light sources 34 can be sequentially illuminated and extinguished to measure the tissue properties for each source by turning power to each of them on and off. Alternatively, multiple light sources 34 can be electronically modulated using encoding methods that are known to one knowledgeable in the art. These encoding patterns include Fourier intensity modulation, Hadamard modulation, random modulation, and other modulation methods.

Figure 2:
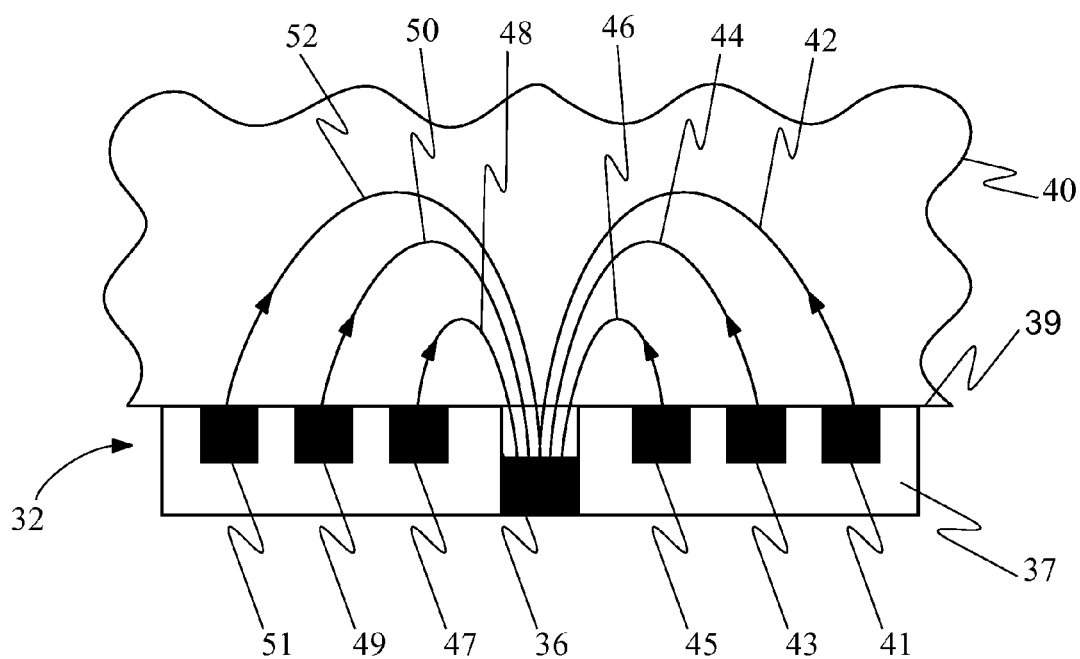
FIG. 2 provides a schematic cross-sectional view of a biometric sensor element coupled to a tissue surface showing multiple mean optical paths.

FIG. 2 shows a cross-sectional view of the sensor head 32 of FIG. 1, for use in diffuse reflectance measurements. Also shown is tissue 40 in contact with the face 39 of the sensor head 32 and the mean optical paths 42, 44, 46, 48, 50, 52 of the light traveling from each light source 41, 43, 45, 47, 49, 51, respectively, to the detector 36. In acquiring tissue spectral data, measurements can be made in at least two different sampling modes. The optical geometry illustrated in FIG. 2 is known as diffuse reflectance sampling geometry where the light sources and detector lie on the same side of the tissue. An alternative method is known as transmission sampling, wherein light enters a thin tissue region such as an earlobe or a fingertip on one side and then is detected by a detector located on the other side of the tissue. Although light in such regions as the silicon-region can penetrate tissue to significant depths of one centimeter or more, depending upon the wavelength, transmission sampling of the tissue limits the region of the body that can be used. Thus, while either mode of sampling is within the scope of the present invention, and especially to analysis utilizing light in the silicon-region, a more versatile sampling method is based upon reflected light.

Referring to FIG. 2, when the tissue is illuminated by a particular light source 41, the resulting signal detected by detector 36 contains information about the tissue optical properties along a path between the source 41 and detector 36. The actual path of any given photon is highly erratic due to effects of optical scattering by the tissue, but the mean optical path 42 is a more regular and smooth curve, as shown in the figure.

This mean optical path is, in general, different for different source-detector separation distances. If another light source 51 is located at the same distance from the detector 36 as light source 41 and the two light sources have the same wavelength characteristics, the resulting signals can be processed as separate elements or can be combined to increase the resulting signal-to-noise ratio of the measurement. If light source 51 has a different wavelength characteristic than light source 41 then, in general, the resulting signals provide unique and useful information about the tissue optical properties, especially as they relate to spectral biometric determinations and may be analyzed as distinct data points. In a similar manner, if two light sources have the same wavelength characteristics and are positioned at different distances from the detector 36 (for example light sources 41 and 43) then the resulting information in the two signals is different and the measurements may be recorded and analyzed as distinct data points. Differences in both wavelength characteristics and source-detector separation provide useful information about the optical characteristics of the tissue 40.

In general, the detector 36 can be located in the center of the sensor head or it can be offset to one side of the sensor head 32 in order to provide for greater source-detector separation distances. The sensor head 32 may have other shapes, including oval, square and rectangular shapes. The sensor head 32 may also have a compound curvature on the optical surface to match the profile of a device in which it is mounted, to incorporate ergonomic features that allow for good optical and mechanical coupling with the tissue being measured, or for other technical or stylistic reasons.

Light that reflects from the topmost layer of skin does not contain significant information about the deeper tissue properties. In fact, reflections from the top surface of tissue (known as "specular" or "shunted" light) are detrimental to most optical measurements. For this reason, FIG. 2 illustrates a sensor-head geometry wherein the detector 36 is recessed from the sensor surface 39 in optically opaque material 37 that makes up the body of the sensor head 32. The recessed placement of detector 36 minimizes the amount of light that can be detected after reflecting off the first (epidermal) surface of the tissue. It can be seen that the same optical blocking effect could be produced by recessing each of the light sources, or by recessing both the detector and the light sources. Other equivalent means of optical blocking can be readily established by one of ordinary skill in the art. Additionally, a force sensing functionality is sometimes built into the sensor to ensure firm contact between the sensor and the skin, minimizing the amount of shunted light. Such force sensing may be performed in various embodiments with electromechanical switches, capacitive sensors, piezoelectric sensors, or other mechanisms known to one of ordinary skill in the art.

One embodiment of the sensor incorporates an optical relay (not shown) between the sensor surface 39 and the skin 40. This optical relay transfers the light from the light sources to the skin and from the skin back to the detector(s) while minimizing light loss and spreading. Methods of performing this function include fiber-optic face plates and tapers, individual optical fibers and fiber bundles, light pipes and capillaries, and other mechanisms known to one of skill in the art. Optionally, the surface of the light relay can be contoured to fit specific product applications and ergonomic requirements. This has the advantage that the structure of the basic sensor can remain constant, but adapted to various product applications by mounting the sensor to one of a series of optical relay units.

Figure 3:
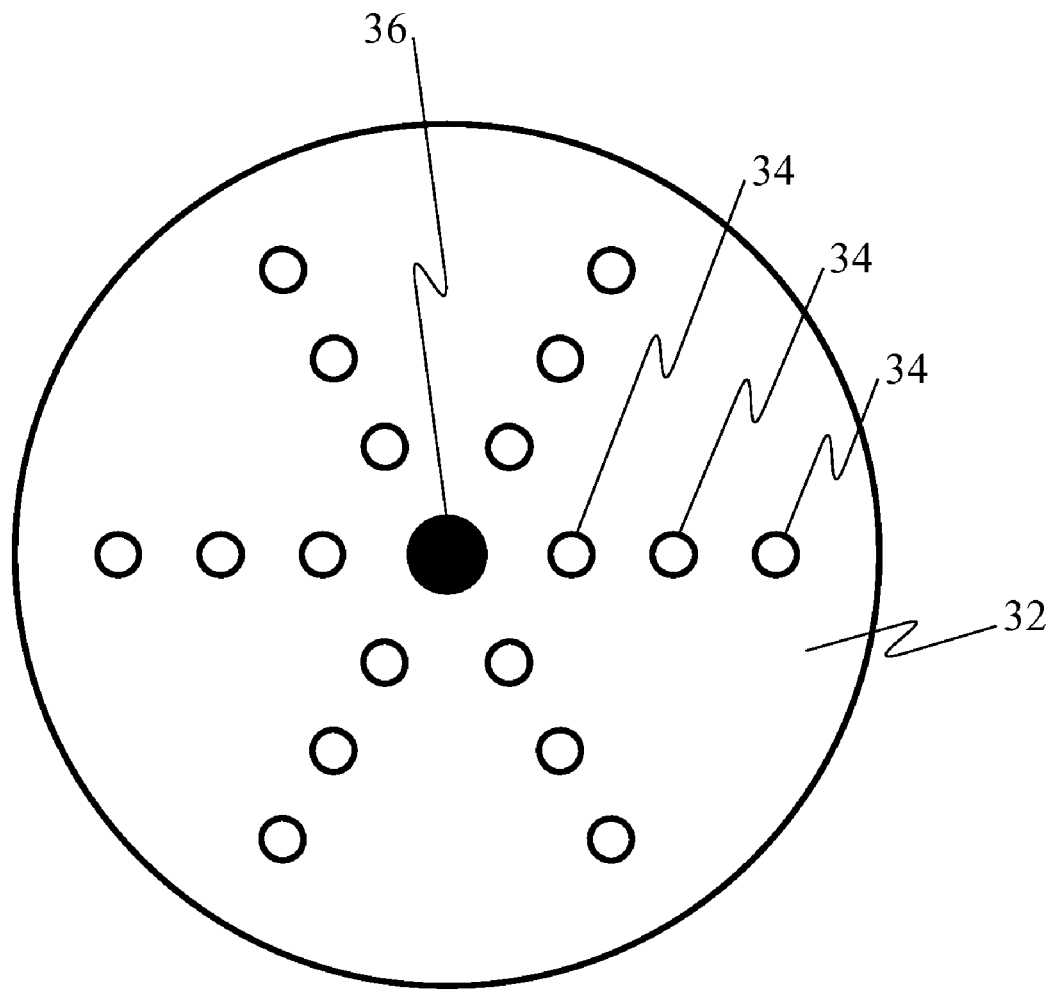
FIG. 3 provides a schematic representation of a top view of a first embodiment of a biometric sensor incorporating multiple light sources arranged with variable source-detector distances.

FIG. 3 shows a top view of the sensor head 32 with a plurality of light sources 34 and a single detector 36 visible. This figure is intended to be representative of configurations that allow for a variety of sources 34 and detectors 36 that have variable spacing between them. In general, this configuration is most applicable in cases where a small number of light sources 34 with different wavelength characteristics are available. In these cases, the variable distance between sources 34 and detector 36 are used to gather additional optical information from the tissue.

Figure 4:
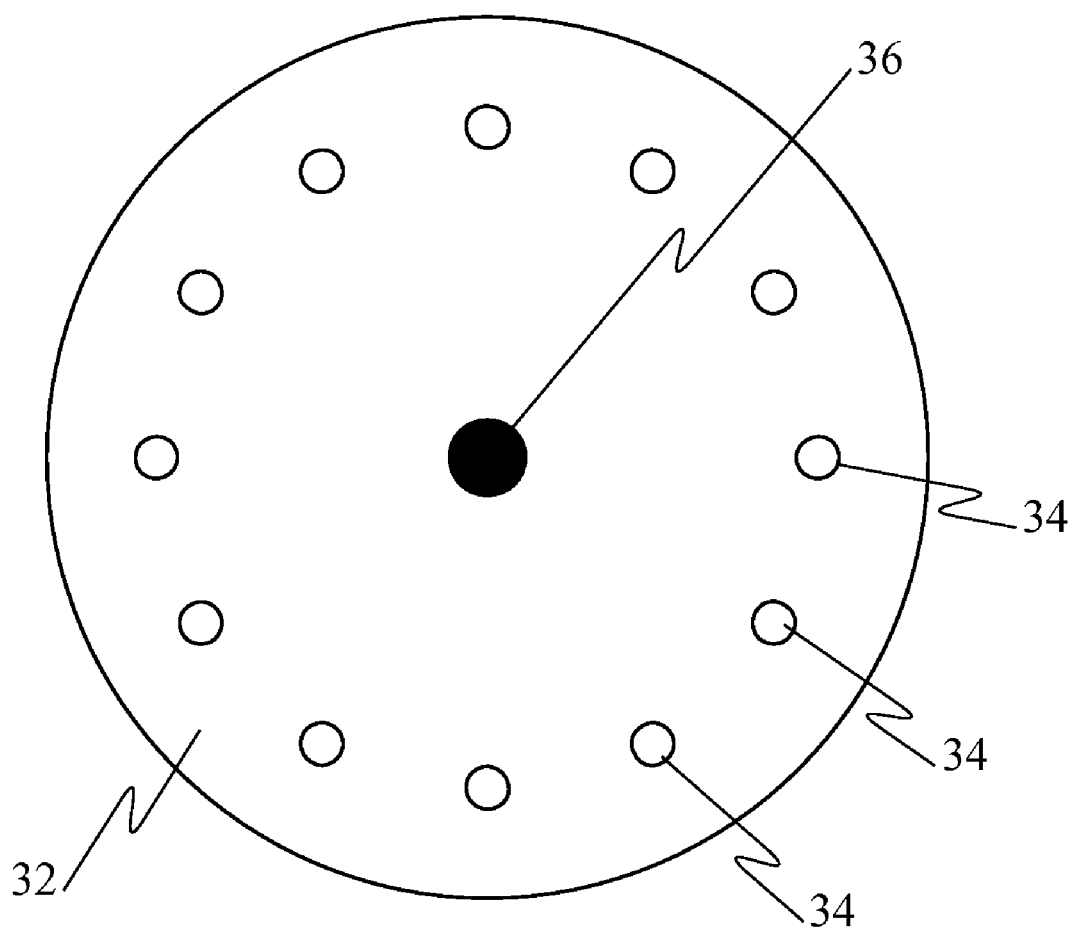
FIG. 4 provides a schematic representation of a top view of a second embodiment of a biometric sensor incorporating multiple light sources arranged with a common source-detector distance.

FIG. 4 shows that the light sources 34 can also be arranged to be equidistant from the detector 36. This configuration is most appropriate in cases where each light source 34 is a different wavelength and sufficient light sources can be obtained to achieve the desired accuracy results for the system. An example of this occurs when the individual light sources are the result of combining optical filters with one or more broadband (e.g., incandescent) light sources. In this case, many unique wavelength bands can be defined and each of the sources 34 can be placed equidistantly from the central detector 36.

Figure 5:
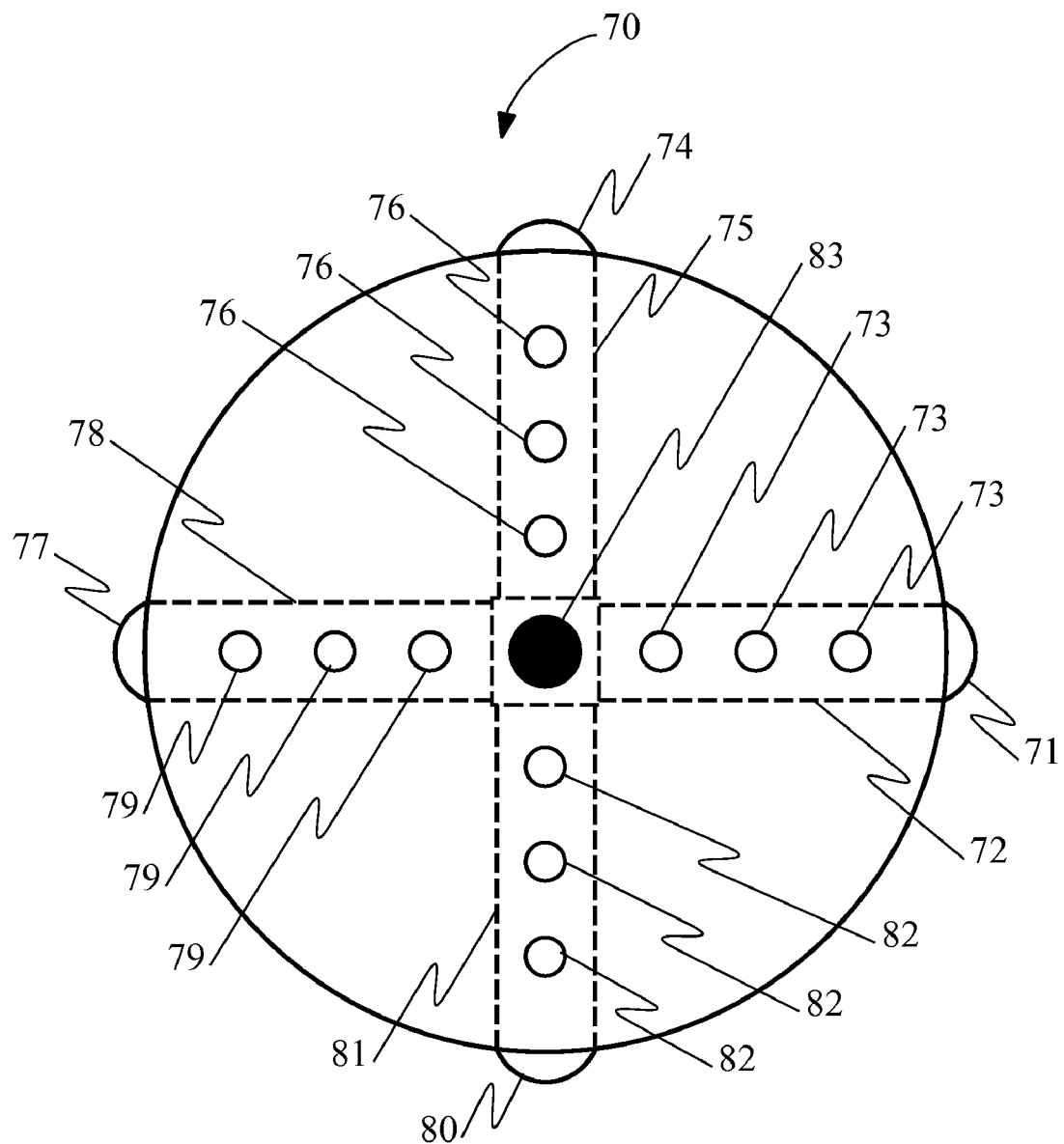
FIG. 5 provides a schematic representation of a top view of a third embodiment of a biometric sensor incorporating multiple sources and a waveguide/aperture plate to provide variable source-detector distances.

An alternative embodiment of a variable source-detector configuration is illustrated in FIG. 5, which schematically depicts a top view of a sensor 70 of this type. In this embodiment, multiple different light sources 71, 74, 77, 80 are arranged around a common detector 83. Four different light sources 71, 74, 77, 80 are shown for illustration but fewer or more can be used in different embodiments. Each of the light sources 71, 74, 77, 80 is optically coupled to a different optical waveguide 72, 75, 78, 81. Each waveguide 72, 75, 78, 81 has individually controllable electronic or mechanical optical shutters 73, 76, 79, 82. These optical shutters 73, 76, 79, 81 can be individually controlled to encode the light by allowing light to enter the tissue from a waveguide 72, 75, 78, 81 at a predetermined position or positions. One method for implementing optical shutters is using micro-electromechanical systems (MEMS) structures, which is a technology well known to one of ordinary skill in the art. In specific embodiments, the light sources 71, 74, 77, 80 may comprise different LEDs, laser diodes or VCSELs. Alternatively, one or more incandescent sources with different optical filters can be used to generate light of different wavelength characteristics to couple into each of the waveguides 72, 75, 78, 81. As well, this MEMS aperture geometry could be used with other illumination sources and geometries illustrated in the other figures in this application.

Figure 6:
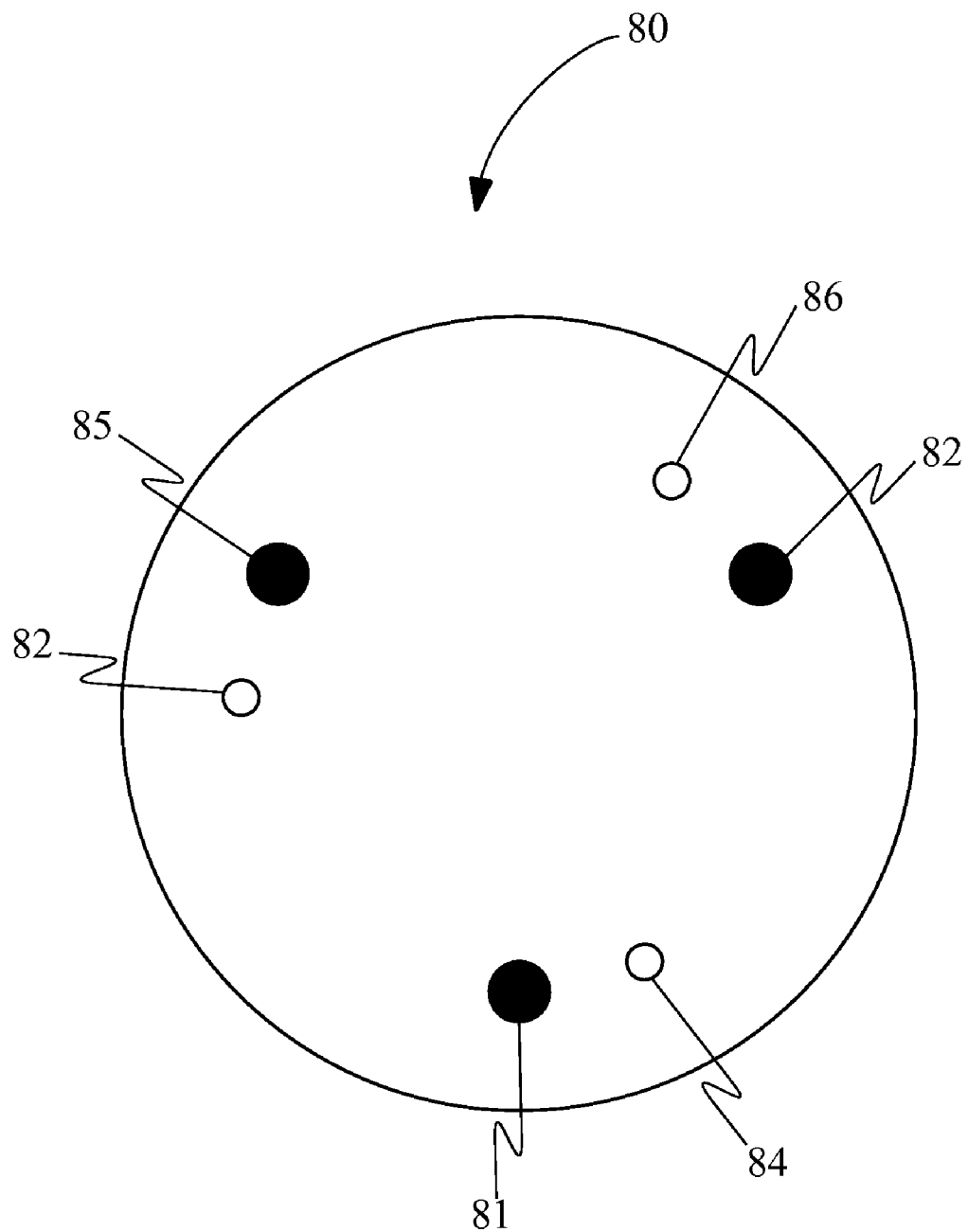
FIG. 6 provides a schematic representation of a top view of a fourth embodiment of a biometric sensor including multiple sight sources and multiple detectors providing variable source-detector separations.

Alternatively, multiple source-detector distances can also be achieved by using a plurality of detector elements, as shown in FIG. 6. This figure schematically depicts a top view of a sensor 80 of this type. In this embodiment, each of three different light sources 82, 84, 86 is positioned relative to three detectors 81, 83, 85 such that the spacing between a given light source and each of the detectors is different. For example, the source detector spacing for a light source 82 is shortest with respect to detector 85 and longest with respect to detector 83. By turning on the light sources 82, 84, 86 in a sequential or encoded pattern and measuring the response at each of the three detectors 81, 83, 85, the tissue characteristics for all of the available source-detector separations at all of the wavelengths can be measured.

Figure 7A:
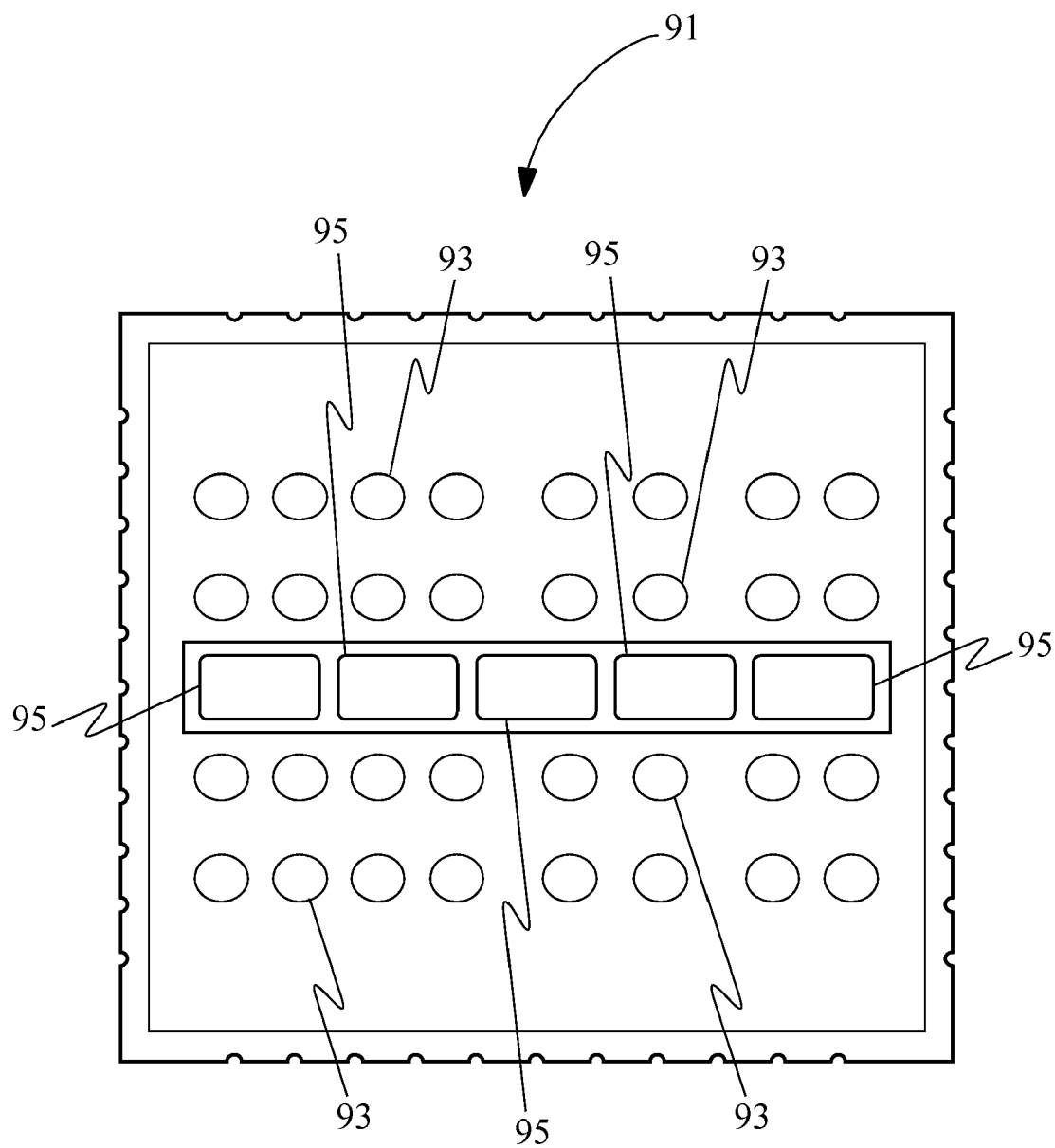
FIG. 7A provides a schematic representation of a top view of a fifth embodiment of a biometric sensor incorporating multiple light sources and multiple detectors providing variable source-detector separations.
Figure 7B:
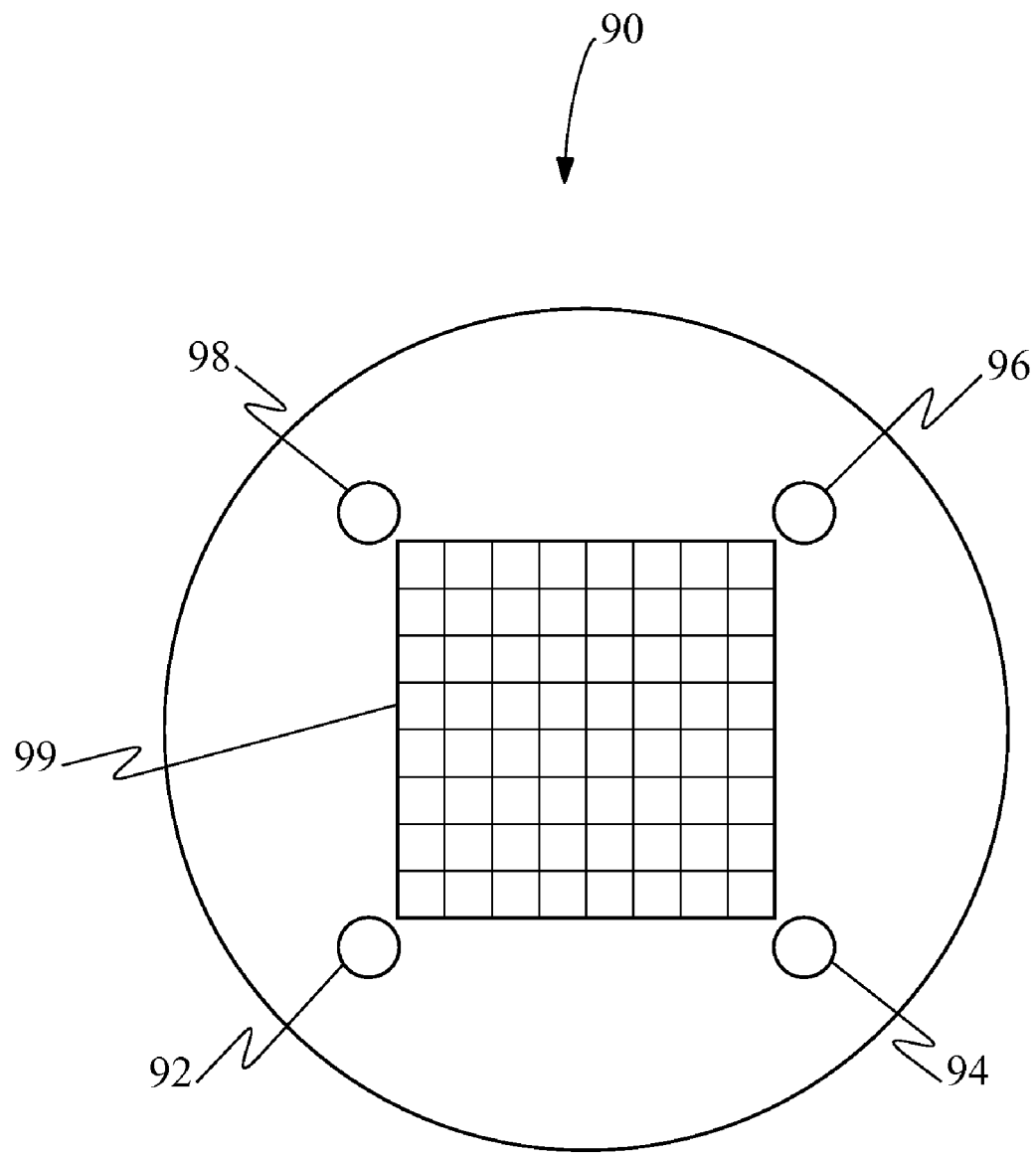
FIG. 7B provides a schematic representation of a top view of a sixth embodiment of a biometric sensor incorporating multiple light sources and a detector array for providing variable source-detector separations.

Another example of the use of multiple source and detector elements that provide multiple source-detector distances is shown with the top view of FIG. 7A. In this embodiment, the sensor 91 includes a row of detectors 95 surrounded on either side by rows of light sources 93. In the illustration, five detectors 95 are provided and two rows with eight sources 93 are provide on either side of the detector row, although other numbers and arrangements of the sources 93 and detectors 95 may alternatively be used. The use of multiple detector elements and multiple illumination sources can be extended to using a detector array, as shown in FIG. 7. This figure schematically depicts a top view of a sensor 90 of this type. In this embodiment, multiple light sources 92, 94, 96, 98 are placed at the perimeter of a detector array 99. The signal detected at each of the array elements then represents a different source-detector separation with respect to the light from a given light source. Many variants on this configuration exist including the use of one-dimensional (1D) or two-dimensional (2D) arrays, and placing sources within the array as well as on the periphery.

The detector(s) can be any material appropriate to the spectral region being detected. For light in the region from about 350 nm to about 1100 nm, a suitable detector material is silicon and can be implemented as a single-element device, a collection of discrete elements, or a 1D or 2D array, depending upon the system configuration and encoding method used. For light in the region from about 1.25 to about 2.5 μm, a suitable detector material is InGaAs and can also be implemented as a single element, a collection of elements, or a 1D or 2D array. Additional detector materials and means of detection include InSb, Ge, MCT, PbS, PbSe, bolometers, and others known to one of ordinary skill in the art.

Once the light passing though the tissue is detected, the signals can be digitized and recorded by standard techniques. The recorded data can then be processed directly or converted into absorbance spectra or noised-scaled absorbance spectra as is known to one of ordinary skill in the art. The data can then be used for spectral identification or verification by the methods described in U.S. Pat. No. 6,560,352, U.S. patent application Ser. No. 09/415,594, and/or U.S. patent application Ser. No. 10/407,589, all of which have been incorporated herein by reference.

Because of the nature of optical spectroscopy, it is difficult to generate spectra of similar shape and absorbance characteristics without using similar material for the sample. For this reason, many common materials, such as latex and wax that are used to defeat other biometric systems such as fingerprint readers or hand geometry systems are ineffective tissue surrogates for a spectral biometric system. By performing a spectral comparison, most non-tissue samples will be rejected, resulting in a strong countermeasure capability against potential intruders.

Similarly, many of the spectral features that are present in the wavelength ranges disclosed by this invention are indicative of living tissue. These features include oxy- and deoxy-hemoglobin bands, temperature effects, intracellular hydration, and others. These effects contribute to the overall spectral signature of the sample being measured and ensure that a matching sample is one that is part of a living person and normally perfused. Thus, a good spectral comparison ensures the "liveness" of a sample and deters the use of dead or excised tissue as a means to circumvent the spectral biometric system.

In some applications, such as Internet access authorization, it may be useful to be able to verify the sex and/or age of the person using the spectral biometric system. Because of both age- and sex-specific difference in skin structure and composition, the optical spectra change in systematic and indicative ways such that the age and sex can be estimated using the biometric spectral data.

In practicing embodiments of the present invention, the tissue spectral data is determined by measuring the light intensity received by the output sensor for the various light sources which give indications of the optical properties of the tissue at different wavelengths and/or at different source-detector separations. As is well known to one of ordinary skill in the art, the signal produced by the detector in response to the incident light levels can be converted into spectral data that can be recorded and used for subsequent analysis for enrollment or authorization of identity.

3. Exemplary Implementations

A small spectral biometric subassembly, such as those discussed above, can be embedded in a variety of systems and applications. The spectral biometric reader can be configured as a dedicated system that is connected to a PC or a network interface, an ATM, securing an entryway, or allowing access to a particular piece of electronics such as a cellular phone, personal digital assistant ("PDA"), electronic fob, or any other portable electronic device. In this mode, one or more people can be enrolled in the biometric system and use a particular reader to gain access to a particular function or area.

Alternatively, the spectral biometric system can configured as a personal biometric system that confirms the identity of a person authorized to use the device (who could be one of a plurality of people authorized by the device), and transmits this authorization and any necessary identifying information about the user to any properly equipped PC, ATM, entryway, or piece of electronics, that requires access authorization. The personal biometric could, after confirming the identity of the user, transmit specific user information and device-specific information along with or instead of an authorization. User-specific information may include identity, financial information, medical information, or other pieces of personal information. Device-specific information may include serial number, tamper warnings, battery-low or other service messages, and other pieces of information.

Instead of performing the biometric authorization procedure onboard the personal biometric system, one can measure the spectral biometric data of the person and transmit the data and any associated identifying information about the user and device to the reader for authentication. One advantage of this latter approach is that the personal biometric system can transmit an identifying code to the reader unit and then use the biometric signal to confirm authorization, which implies that the system needs to perform a verification task rather than the more difficult identification task. Yet, from the user's perspective, the system recognizes the user without an explicit need to identify himself or herself. Thus, the system appears to operate in an identification mode, which is more convenient for the user.

An additional advantage of a personal biometric system is that if an unauthorized person is able to defeat the personal biometric system code for a particular biometric system-person combination, the personal biometric system can be reset or replaced to use a new identifying code and thus re-establish a secure biometric for the authorized person. This capability is in contrast to multi-person biometric systems that base their authorization solely on a biometric signature (spectral, as well as any of the other biometric techniques such as fingerprint, iris, facial, etc.). In this latter case, if an intruder is able to compromise the system by somehow imitating the signal from an authorized user, there is no capability to change the biometric code since it is based solely on a fixed physiological characteristic of a person.

Figure 8A:
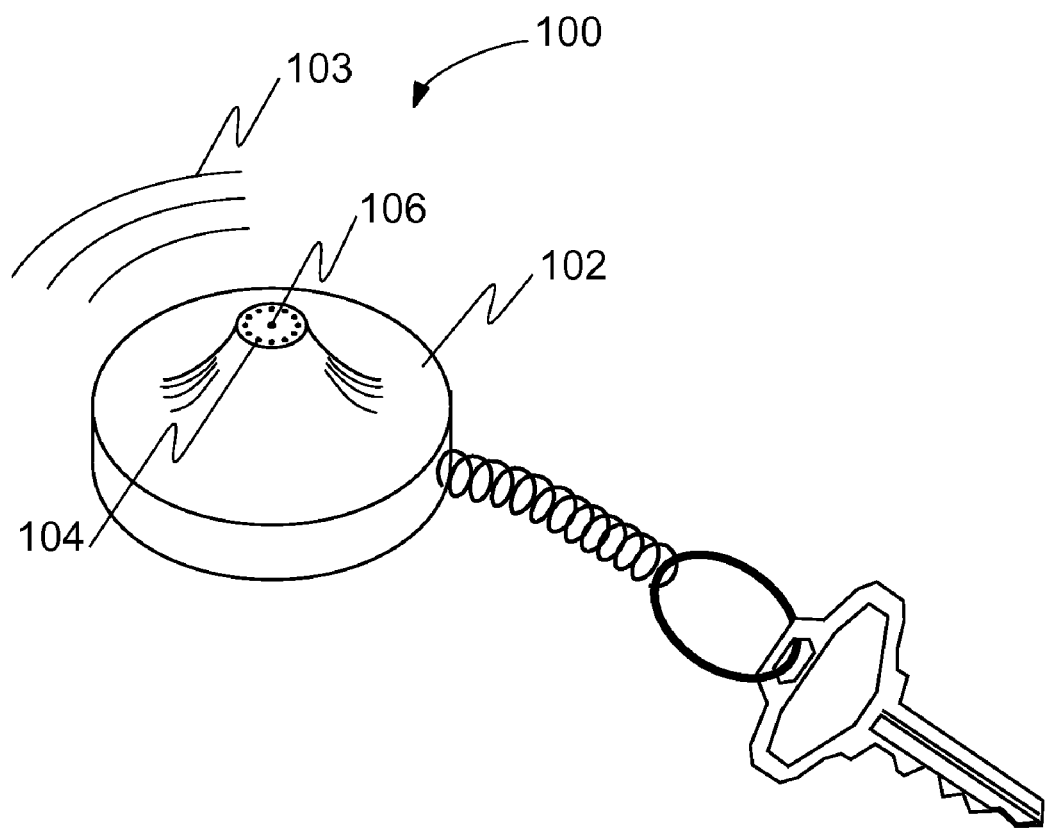
FIG. 8A provides a schematic representation of a personal biometric sensor built into a key fob.

FIG. 8A shows one embodiment of a personal spectral biometric system 100 in the configuration of an electronic key fob 102. The equidistant sensor configuration of FIG. 4 is shown for illustration purposes only; more generally, any of the disclosed sensor configurations (or other equivalent configurations) may be implemented in the electronic key fob. The illumination 104 and detection system 106 are built into the fob 102, as are the data collection and digitization devices for collecting and digitizing the spectral information. In one embodiment, short-range wireless techniques based upon RF signals 103 can be transmitted to communicate between the fob and a corresponding reader (not shown) that allows access to the PC, entryway, etc. In another embodiment, an infrared optical signal can be used to transmit the information between the fob and the reader. In another embodiment, a direct electrical connection is established between the personal biometric system and the reader. The actual comparison between the measured spectral data and the previously recorded enrollment spectrum (template) can be made either within the fob or at the reader. In the former case, the logical operations necessary to perform the comparison are done within the fob and then a simple confirmed or denied signal is transmitted to the reader. In the latter case, the most recent measured spectrum is transmitted to the reader and the comparison and decision is accomplished at the reader or at a host to which the reader is connected. In either case, the communication between the fob and the reader needs to be performed in a secure manner to avoid interception and unauthorized use of the system. Methods for ensuring secure communication between two devices are well known to one of ordinary skill in the art.

Figure 8B:
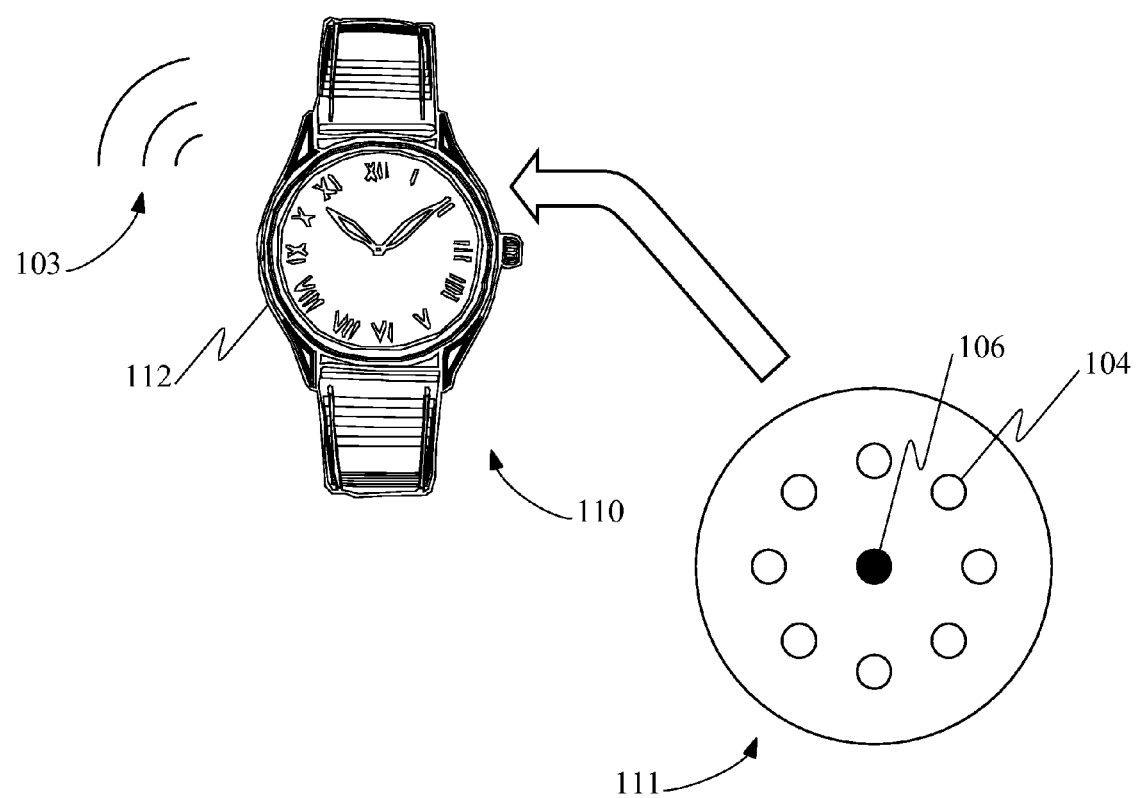
FIG. 8B provides a schematic representation of a personal biometric sensor built into a backplate of a wristwatch.

A second embodiment of a personal spectral biometric system 110 is depicted in FIG. 8B. In this case, the biometric reader 111 is built into the case of a wristwatch 112 and operates based upon signals detected from the skin in the area of the wrist. The operation of this system is identical to the operation described for the biometric fob. FIG. 8B again shows the equidistant-sensor geometry of FIG. 4 for illustration purposes only; more generally, any of the sensor geometries previously disclosed or other equivalent configurations can be used for this application.

Figure 8C:
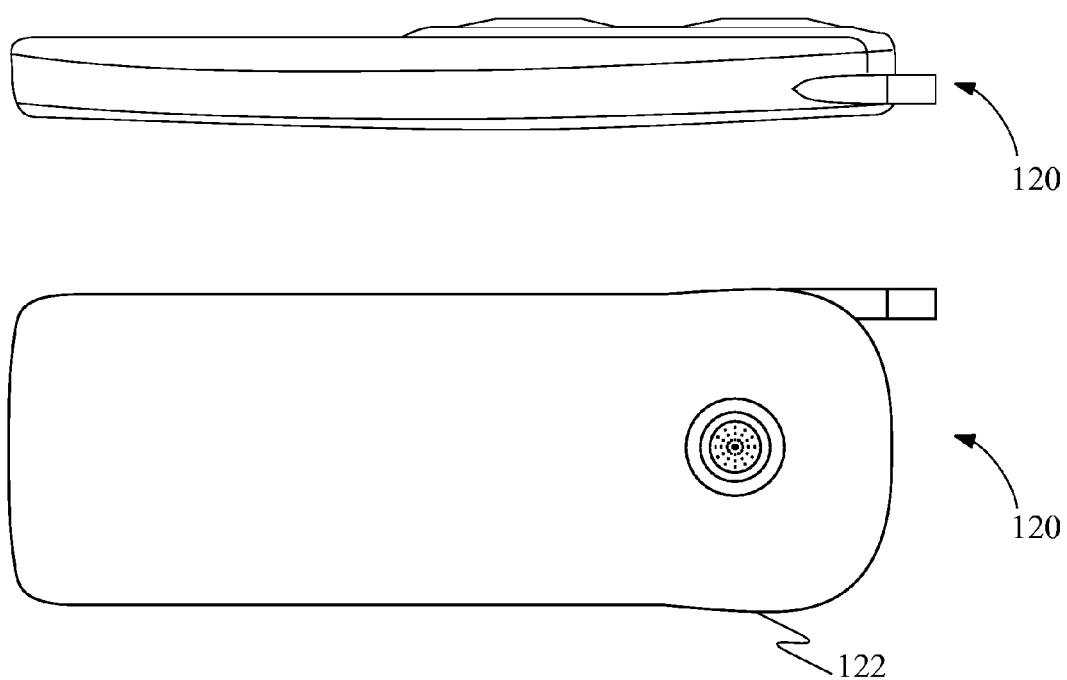
FIG. 8C provides a schematic representation of a personal biometric sensor built into a cellular telephone.

In addition to the watch or fob, similar biometric capability can be built into other personal electronic devices. For example, FIG. 8C provides side and back schematic illustrations of a cellular telephone 120 that comprises a biometric reader 122. In this instance, the biometric reader 122 is shown on the back of the cellular telephone 120, although it may be placed in other positions as well. FIG. 8C shows the variable-spacing sensor geometry of the biometric reader 122 described with respect to FIG. 3 for illustration purposes only; more generally, any of the sensor geometries previously disclosed or other equivalent configurations can be used for this application. The operation of the biometric reader 122 in the cellular telephone 120 may be similar to that described in connection with FIG. 8A for the fob, with data collection and digitization devices being included internal to the cellular telephone. Comparisons between measured spectral data and a previously recorded enrollment spectrum may be made within the cellular telephone 120 or at a separated reader.

Figure 8D:
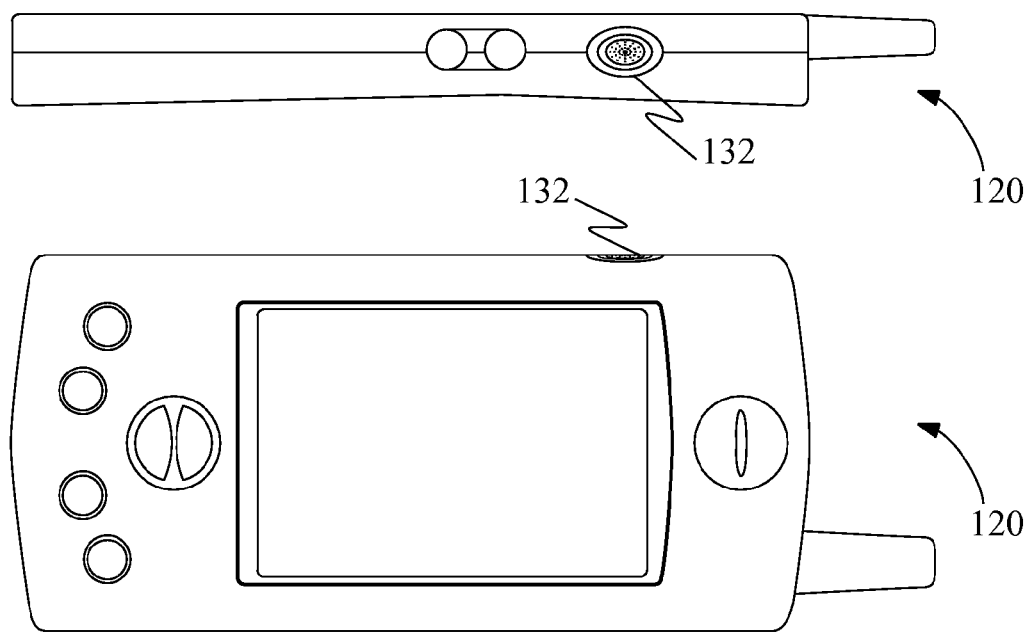
FIG. 8D provides a schematic representation of a personal biometric sensor built into a personal digital assistant.

FIG. 8D provides a further example of a personal electronic device that may be configured with biometric capability in the form of a PDA 130, with both side and front schematic views. In this instance, the biometric capability is provided with a biometric reader 132 on the side of the PDA 130, although other alternative positions may be used. The variable-spacing sensor geometry described with respect to FIG. 3 is used to illustrate one form of the biometric reader 132, in this case having light sources distributed elliptically about the detector; more generally, any of the sensor geometries previously disclosed or other equivalent configurations can be used for this application. As for the other devices, data collection and digitization devices may be included internally to the PDA 130 to perform data collection and digitization functions. Comparisons between measure spectral data and an enrollment spectrum may be made within the PDA 130 or at a separated reader.

Figure 8E:
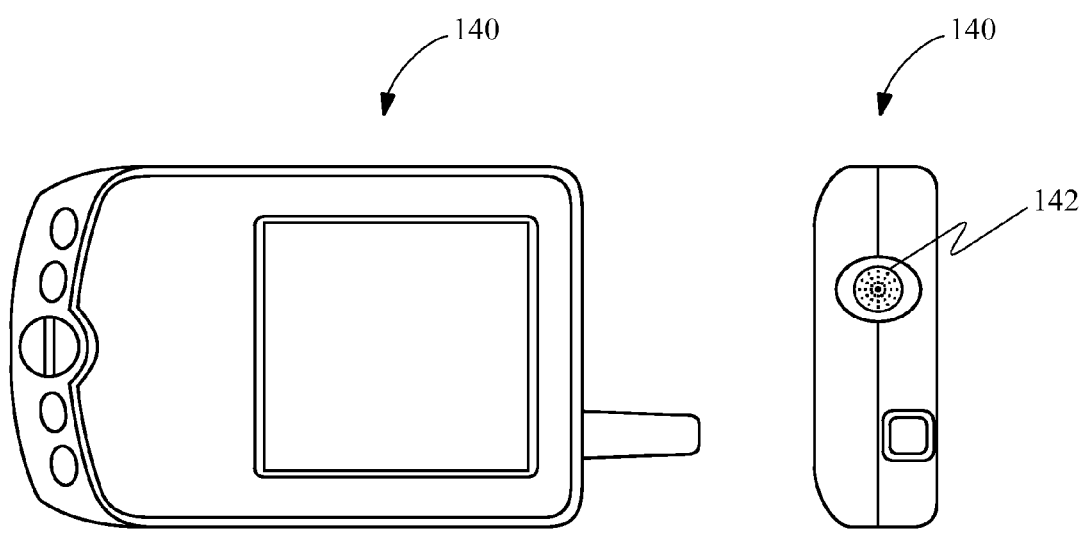
FIG. 8E provides a schematic representation of a personal biometric sensor built into a combined cellular telephone/personal digital assistant.

Still another example of a personal electronic device configured with biometric capability in accordance with an embodiment of the invention is shown in FIG. 8E for a combined cellular telephone/PDA 140 with top and front views. The location of the biometric reader 142 may be in any suitable location, but is shown on the top for illustrative purposes. The illustration of the biometric reader 142 having the variable-spacing geometry described with respect to FIG. 3 is again not intended to be limiting since any of the previously disclosed sensor geometries or other equivalent configurations may alternatively be used.

Still other devices may be configured to include the biometric sensor in other embodiments. For example, the compact sensors disclosed can also be put into firearms to prevent unauthorized usage. In particular, the biometric sensor could be placed in the handgrip of a weapon such as a handgun or other firearm to sense tissue properties while the gun is being held in a normal manner.

Figure 9:
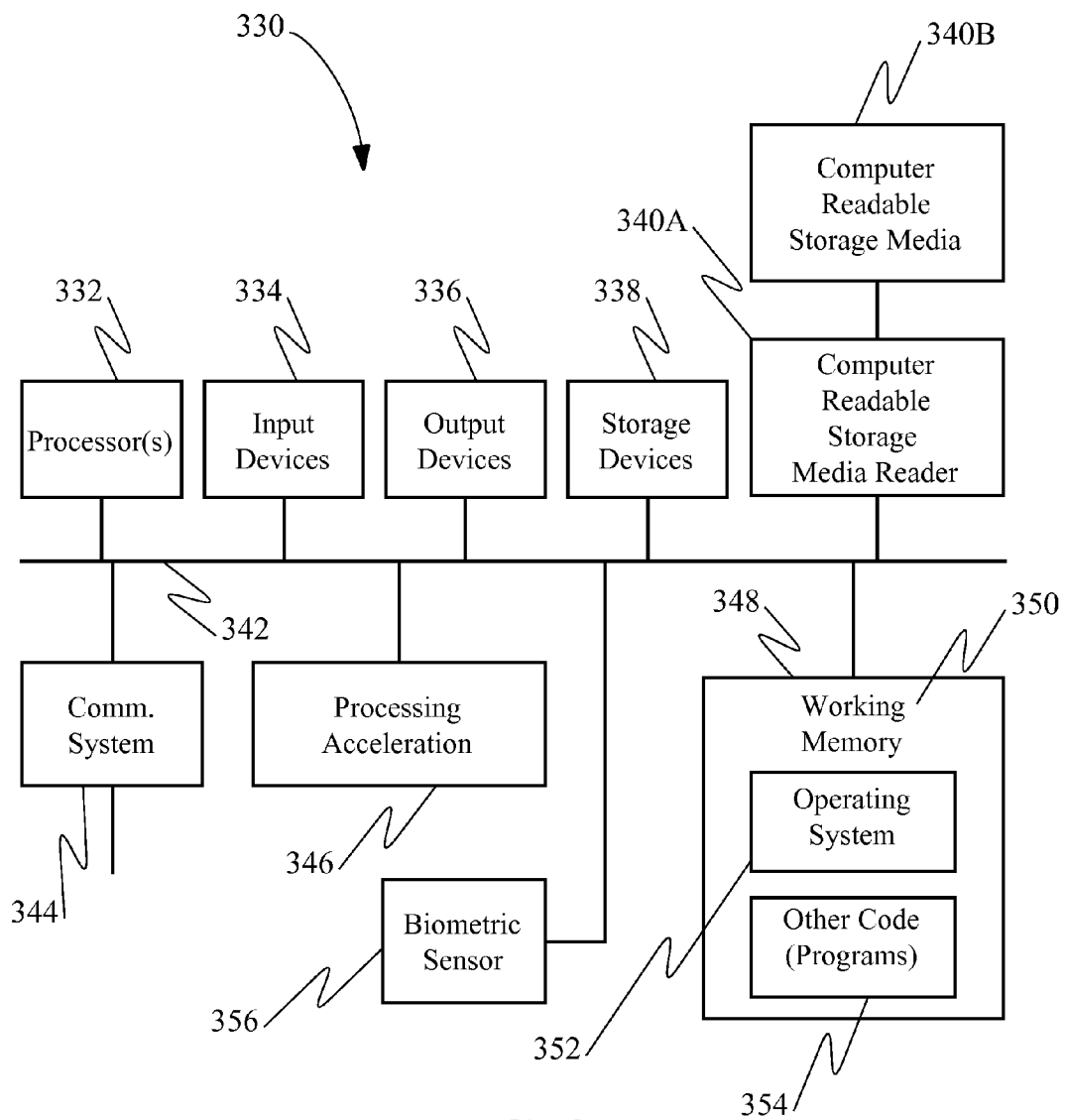
FIG. 9 provides a schematic representation of a computer system that may be used to manage functionality of biometric sensors in accordance with embodiments of the invention.

Management of the functionality discussed herein for the biometric sensor may be performed with a computer system. The arrangement shown in FIG. 9 includes a number of components that may be appropriate for a larger system; smaller systems that are integrated with portable devices may use fewer of the components. FIG. 9 broadly illustrates how individual system elements may be implemented in a separated or more integrated manner. The computational device 330 is shown comprised of hardware elements that are electrically coupled via bus 342, which is also coupled with the biometric sensor 356. The hardware elements include a processor 332, an input device 334, an output device 334, a storage device 338, a computer-readable storage media reader 340a, a communications system 344, a processing acceleration unit 346 such as a DSP or special-purpose processor, and a memory 348. The computer-readable storage media reader 340a is further connected to a computer-readable storage medium 340b, the combination comprehensively representing remote, local, fixed, and/or removable storage devices plus storage media for temporarily and/or more permanently containing computer-readable information. The communications system 344 may comprise a wired, wireless, modem, and/or other type of interfacing connection and permits data to be exchanged with external devices. The storage devices typically hold information defining the stored spectra as well as any personalized-setting information that may be used.

The computational device 330 also comprises software elements, shown as being currently located within working memory 350, including an operating system 352 and other code 354, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

4. Enrollment Functions a. Initial Enrollment

Figure 10:
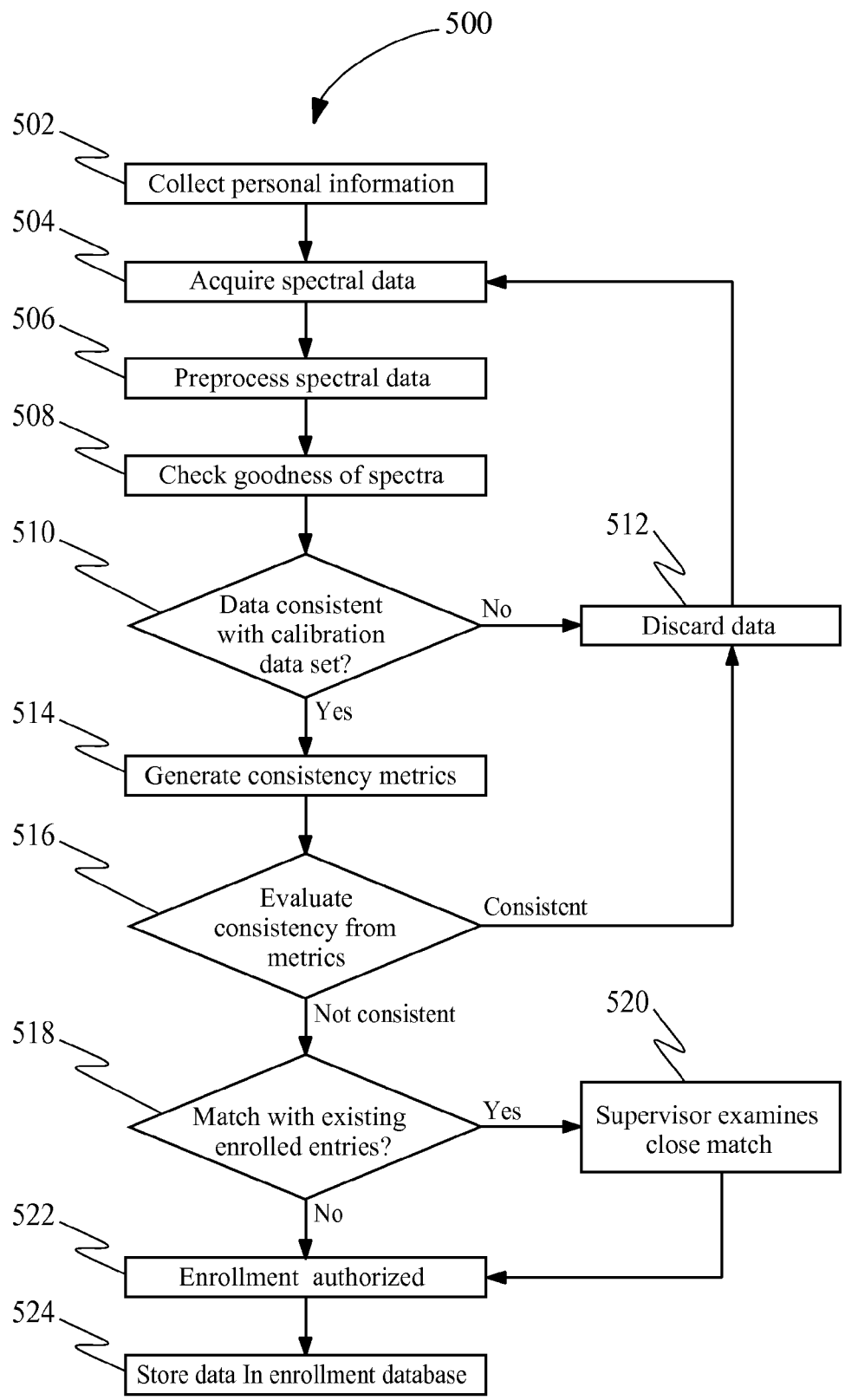
FIG. 10 provides a flow diagram illustrating initial biometric enrollment processes in accordance with an embodiment.

In FIG. 10 the major elements of a spectral biometric enrollment sequence 500 are shown. Since a successful enrollment authorizes the user for future access to the systems or services protected by the biometric, the enrollment sequence 500 is generally performed under secure means or controlled situations. Where applicable, enrollment might be supervised by an authorized person (e.g. for a bank clerk would have to supervise enrollment in a biometric system used for automated financial transactions) or take place in an authorized location (e.g. enrollment for a biometrically enabled automobile might have to occur at an authorized car dealership), or take place when an authorizing token is presented (e.g. a password or key is used to start the enrollment process), or take place under authorized conditions (e.g. a biometrically enabled cell phone can only initialized when located in a particular authorized household), or occur only when a device is first activated or reset.

Once the enrollment is enabled, the sequence 500 begins with the collection of personal information 502, which is linked to the spectral biometric data. At a minimum, this personal information consists of a unique identifier that can be used by automated or manual means to refer to the particular biometric enrollment data. The personal information can also include items such as name, addresses, contact information, demographic information, medical information, passwords and PIN's for other systems, authorization codes, links to other databases or systems, and any other information pertinent to the particular biometric application. These information can be entered by a variety of means including manual entry during an enrollment interview, read automatically from a magnetic card, proximity card, or smart card, or downloaded from other systems and databases.

When the collection of personal information 502 is complete, the next block shown in the sequence is the acquisition of spectral data 504. The acquisition commences when the person being enrolled places the appropriate portion of the hand or other body part in contact with the spectral biometric sensor and a trigger is given. The trigger can be manually activated or based on a mechanical, optical, electrical or magnetic switch that senses contact between the sensor and the skin site being enrolled. As few as a single enrollment sample can be taken, but more typically two or more independent samples are taken to ensure that the samples are consistent, as explained later in the sequence. If multiple enrollment samples are taken, the person being enrolled typically withdraws their hand from the sensor and replaces it in order to collect a new independent sample.

Once the candidate enrollment sample or samples are collected, they may undergo one or more preprocessing operations 506. Preprocessing of the spectral data may include a decoding step if the data were collected in an encoded fashion such as Hadamard, Fourier, frequency division multiplexing, spread spectrum techniques, and others of similar nature. Operations necessary to invert the encoding imposed by such techniques are well known to one of ordinary skill in the art. Other systems such as sequential illumination of different wavelength sources do not require decoding.

Whether or not the data are required to be decoded, additional preprocessing steps may include generating the ratio of the biometric spectra to an optical reference spectrum, performing a logarithmic transform of the spectral data, performing explicit corrections to account for sensor-to-sensor variations or environmental influences of temperature, humidity and pressure, scaling the data by some function, and selecting certain subsets of the spectral data for further processing. These and other techniques are well known in the art.

After preprocessing, if any, the spectra can then be checked for goodness 508, which confirms that the candidate enrollment spectra have optical characteristics that are similar to the type of tissue for which the sensor is calibrated. In particular, if the goodness check 508 generates a metric or metrics that ensures that the enrollment samples have optical properties that are similar to living skin collected from a human hand (for example). As such, this procedure performs the spectral liveness determination for the enrollment data. In order to do this, the candidate enrollment samples are compared to calibration factors that describe the spectral qualities of the calibration samples (which in this example are presumed to be taken from the skin on one or more living human hands). These factors can be generated using a variety of standard techniques including principal component analysis, linear discriminant analysis, partial least squares, Fourier analysis, cluster analysis and other numerical modeling methods known to one of ordinary skill in the art.

Analyses and metrics that can used to ensure that the candidate enrollment samples are good (i.e. consistent with the calibration data) include Mahalanobis distance, Euclidean distance, residuals of the enrollment spectra when fit by the calibration factors, cluster analysis and other methods that are known to one of ordinary skill in the art (see for example, *Multivariate Calibration* by Martens and Naes, John Wiley & Sons, 1993, chapter 5, which is incorporated herein by reference). The goodness decision 510 is based on one or more of these metrics to determine if each of the candidate enrollment spectra is consistent with the calibration data set. If so, the enrollment process continues with a consistency check described below. If not, the candidate enrollment data are discarded at block 512 (either all enrollment samples or only the ones that are deemed to be not good) and new enrollment data are collected to replace them. There are also a variety of logical options that the enrollment process can be incorporated in this loop that are not shown, such as a try counter to permit a limited number of enrollment attempts before flagging an error condition.

The next step in the enrollment process 500 is the generation of consistency metrics 514 followed by a consistency decision 516 based on those metrics. The consistency check confirms that the multiple candidate enrollment samples are sufficiently similar to each other to take them as valid. This portion over the overall procedure 500 is omitted in cases where the system operates with only a single candidate enrollment spectrum is taken. In cases where a consistency determination 516 is performed, the methods used can be similar to the methods used for goodness 510 with the difference being that the enrollment spectra are compared to themselves instead of compared to the calibration data. As an example, consider the case where Mahalanobis distance is used as a metric for both the goodness 508 and consistency 514 steps. In the case of goodness, the spectral mean of the calibration data is subtracted from each of the candidate enrollment data and the Mahalanobis distance of this difference is calculated. If the distance is consistent with the distances that the mean-centered calibration data produced, then the goodness according to this metric is acceptable. Conversely, when using the same data and same metric for a consistency check, the mean of the candidate enrollment spectra themselves are subtracted from each of the candidate spectra (or other similar operations can be performed such as subtracting on of the candidate spectra from each of the others). If the resulting Mahalanobis distances are sufficiently small, then the candidate enrollment spectra are deemed to be consistent in the consistency decision 516.

The outcome of the consistency decision 516 has similar options and results as the goodness decision 510. In the case where the candidate enrollment samples are found to be inconsistent, some or all of the samples are retaken. In the case where the samples are found to be consistent, then the enrollment process 500 may proceed to check for a match with the existing enrolled entries 518. Determining where there is a match with the existing enrolled data is particularly important in a biometric system that is being used in an identification mode where participants may have an incentive to assume false identities. Examples of such situations include biometrics systems used to authorize voting, the issuance of a driver's license, identification card, passport, credit card, welfare benefits or other item of tangible value.

Matching against the enrolled database 518 relies on the use of specific, predetermined spectral features or factors. These factors are determined during an earlier calibration phase and are chosen to enhance person-to-person effects relative to typical spectral changes experienced by a single person or changes that occur within and between biometric sensors. Examples of techniques for generating the factors include principal component analysis, linear discriminant analysis, quadratic discriminant analysis, partial least squares, and other multivariate methods as is known to one of skill in the art. In one embodiment, the factors for determining a match to the enrolled database 518 are generated using principal component analysis (PCA) operating on a set of calibration data that have been collected from multiple people in multiple environmental conditions over time spans that are representative for the actual operation of the biometric sensor.

In the case where a close match is found, a properly authorized supervisor can examine the pertinent details at block 520 and decide whether to authorize the enrollment 522 based on any evidence of falsification. In the cases where either no close matches are found or a supervisor authorizes enrollment in the presence of a close match at block 522, the enrollment data are stored in the enrollment database 524 and the enrollment process is completed.

b. Other Enrollment Functions

Several embodiments of the invention provide methods for managing enrollment. An outline of several aspects of such enrollment management is presented in FIG. 11, which provides an overview of an identification or verification function in the form of a flow diagram. When the identity of an individual is to be checked to determine whether to allow or deny access, a tissue spectrum is collected from the individual at block 302 using one of the methods and systems described above. The collected tissue spectrum is compared with a set of one or more stored spectra at block 304. Such a comparison includes extracting the relevant identification indicia from the spectra as described above and examining corresponding database entries. Identification of a match between the collected spectrum and a stored spectrum at block 306 generally comprises ensuring that the relevant identification indicia differ by less than a predetermined threshold.

If there is no match between the collected spectrum and any of the stored spectra, the individual is either allowed access or denied access in accordance with a default setting of the system. It is expected more usually that the inability of the system to identify the individual will result in a default denial of access. If a spectral match is found at block 306, it is possible for the system to respond in a similar default manner, such as by providing access to any individuals that are properly identified. The flow diagram indicates additional embodiments, however, that provide for the possibility of specific denial of access to certain identified individuals. At block 308, enrollment criteria for the identified individual indicating whether that person is to be allowed or denied access are examined. In accordance with the check at block 310, access is either allowed or denied at block 312 or 314 depending on the enrollment type of the individual.

The ability to identify individuals who are explicitly to be denied access, as opposed to denying access on a default basis to those who cannot be identified, provides a number of advantages to the system. For example, if the biometric sensor is comprised by a handgun, the system may identify the owner as the only individual permitted to use the device, and may additionally explicitly prohibit individuals identified as the owner's children from using the device. Thus, in accordance with the flow diagram of FIG. 11, when the owner wishes to use the device, his identity is confirmed at block 306 and he is allowed access at block 312. When an unknown party attempts to use the device, he is denied access on a default basis at block 320. When one of the identified owner's children attempts to use the device, however, access is denied explicitly at block 314. Such explicit denial provides greater security against misuse of the device.

It is also possible to use the explicit-denial capability of a biometric system in a fixed installation such as a home, place of business, or an automobile. For example, a biometric system installed at the entryway of a place of business can be used to admit authorized employees and temporary workers. If an employee is fired or the term of the temporary employee expires, then their enrollment data can be shifted from the authorized to the unauthorized database, and an explicit check is made to deny access to the former employee if he or she attempts to enter.

In some embodiments, allowing access at block 312 may also comprise personalizing settings. For example, supplementary information regarding the identified individual may be stored in addition to storing identification indicia. This supplementary information may also be updated over time to reflect better identification of settings suitable for each individual. For example, in one embodiment the biometric sensor is comprised by an automobile that is used by multiple individuals and acts as a security device. When one of those individuals accesses the automobile, she is not only provided with access to it at block 312, but environmental aspects such as seat positions, radio settings, temperature, etc. and safety characteristics such as air-bag deployment profiles are automatically configured for her. In another embodiment, the biometric sensor is comprised by a television remote control and is positioned to identify the individual holding the device automatically. A processor programmed to track viewing habits is configured to discriminate by the identified individual. Thus, over time, whenever one of the individuals handles the remote control, it may automatically adjust settings, such as selecting certain preferred channels, volume levels, etc., that are individualized. The preceding are examples in which the biometric sensor is used to automatically personalize the device or environment to the specific person's requirements or tastes.

In applications that are dedicated to personalization tasks rather than providing security against unauthorized usage, a further processing step on initial enrollment may be performed. Once a good enrollment spectrum is collected, or an existing enrollment spectrum is updated, a mathematical analysis is initiated to determine features that best separate the existing enrolled users. The result of this discriminant analysis then modifies the calibration coefficients that are used in blocks 304 and 306 of FIG. 11 to determine a matching tissue spectrum. The ability to customize the calibration coefficients for a particular set of enrolled users in this way allows the overall performance of the personalization task to be improved.

Figure 11:
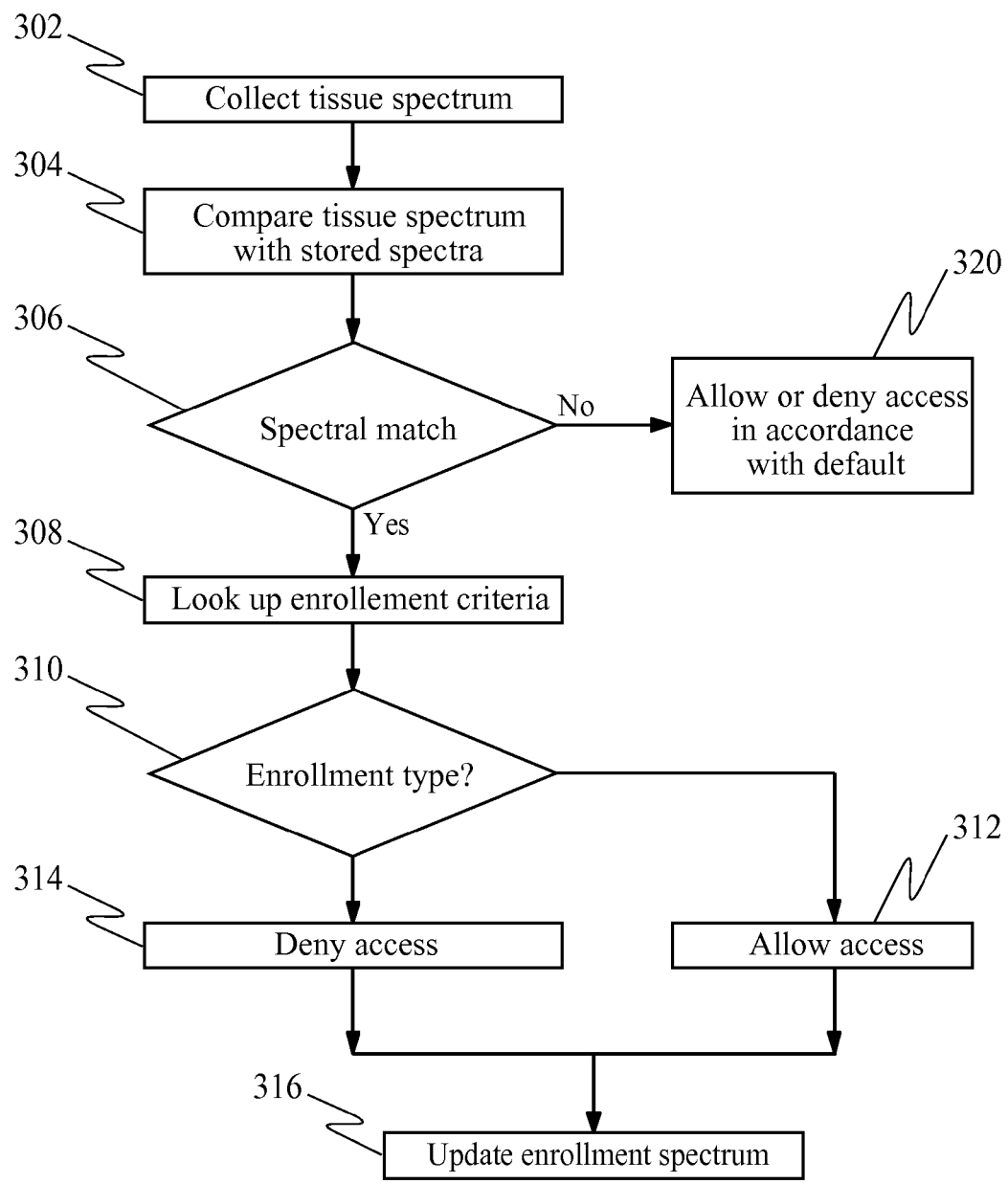
FIG. 11 provides a flow diagram illustrating biometric enrollment management processes in accordance with embodiments of the invention.

Block 316 of FIG. 11 indicates another enrollment aspect included in certain embodiments of the invention. Over time, it is possible for changes to occur in any living system that may result in changes to the spectral identification indicia used in embodiments of the invention. These differences are generally insufficiently large to prevent a proper identification, but may accumulate over time. In a similar manner, small but progressive changes in the sensor due to aging, wear or environmental effects can also accumulate to significant levels. Thus, in either case, once a spectrum collected at block 302 is authenticated, an update may be performed of the stored spectrum at block 316 to reflect the differences between the current spectrum and the stored enrollment. While such an update could comprise substituting the stored spectrum with the collected spectrum, more generally the method uses a weighting averaging technique to mitigate sharp changes.

Such an updating technique may also be used in other embodiments. For example, spectral variations may also result from differences in individual biometric sensor arrangements. Thus, in one embodiment, a spectral profile for each individual is stored for each sensor, either locally to the sensor or centrally with an identification of the sensor. Updates are then performed for each sensor when an individual uses it for identification, having the effect of tuning each biometric sensor to its own individual characteristics.

The enrollment-management methods described with respect to FIG. 11 may be implemented on a computational device such as the one illustrated schematically in FIG. 9.

5. Extended Functionality

A number of embodiments of the invention exploit the illumination and/or light-detection capabilities provided by the biometric sensor. These capabilities are used to provide functions that are supplementary to the identification and/or verification functions. As such, these embodiments are especially suitable when the biometric sensor is comprised by a portable device, such as a portable electronic device. In some embodiments, activation of the supplementary functions may be tied with a service contract. In these instances, some of the functions may be of interest to a customer for a modest increase in service fee even if the customer would not be inclined to purchase a separate device dedicated to performing those functions. For example, in one embodiment, the biometric sensor is comprised by a cellular telephone. The cell-phone provider offers extended functionality of the biometric sensor in accordance with the embodiments described below for the modest fee surcharge.

a. Spectrometer Capabilities

In one set of embodiments, the spectral-analysis capabilities of the biometric sensor are extended to spectral analysis of material other than tissue. While a number of specific examples are provided to illustrated such extended functionality, the examples are not intended to be limiting and several other examples will be evident to those of skill in the art after reading this description. In some of the embodiments, the spectral-analysis capabilities are to identify changes, such as for the detection of conditions in humans that manifest themselves through spectroscopic changes in skin or other tissue. In other embodiments, the spectral-analysis is performed according to an absolute scale where the specific spectral characteristics are independently relevant. In some of the specific embodiments discussed below, the spectral analysis is used to identify a physiological state of an individual. Identification of such a physiological state may be made by measuring the spectral variation of a measured spectrum for light scattered by tissue of the individual, and comparing it with a reference spectral variation. The consistency of the measured spectral variation with the reference spectral variation allows a determination of the physiological state.

For example, in one embodiment, the extended functionality comprises a stress and/or lie detector. It is known that stress in humans causes a characteristic change in skin color, usually reddening, that may be detected spectroscopically. The change in skin color is believed to result from changes in the flow of blood in tissue as a result of the stress. This extended functionality may be included in the device by storing a reference spectrum for individuals when they are not under stress. When a subsequent spectrum is measured in accordance with the descriptions above, it may be compared to the reference spectrum using an appropriate multivariate discrimination method such as linear or quadratic discriminant analysis to determine whether such indicia of stress are present. In some cases, the measured and reference spectra may be acquired close in time. For example, during a questioning session, an initial spectral baseline may be determined by having a subject respond to a base set of questions in a known manner, responding truthfully to some and falsely to others. These results then effectively provide a spectral calibration against which the response to questions whose truthfulness is unknown may be measured.

In another embodiment, the extended functionality comprises a tanning meter. Similar to the stress and/or lie detector, functionality as a tanning meter is included by identifying changes in skin color, in this instance in response to exposure to sunlight or other ultraviolet radiation, such as may be provided in a tanning booth. An advantage to this use of the device is that exposure levels may be quantified on an individual basis and close in time to the tanning activity in order to rapidly determine sufficient exposure and avoid overexposure. Other techniques for determining excessive exposure are qualitative, relying on such broad factors as general skin type, eye color, hair color, etc. These qualitative techniques provide, at best, a crude estimation of excessive exposure. Use of the spectral analysis provided by embodiments of the invention instead provides much more accurate information.

In a further embodiment, the extended functionality comprises a complexion monitor. In a number of applications, notably in the cosmetics industry, skin color and composition are used as a guide, such as for choices in make-up color, hair-dye color, clothing color, etc. Qualities of the skin of interest in this application may include amount and type of collagen, melanin, elastin, sebum, hemoglobin, moisture content, skin surface characteristics, and other physiological, chemical, and structural characteristics of the skin. The ability of embodiments of the invention to quantify skin characteristics permits more reliable choices than provided by purely qualitative evaluations of skin color.

In some instances, the physiological state of an individual may be defined by concentration of a substance in the individual's tissue. For instance, the extended functionality may comprise a hemoglobin monitor. Similar to the effects of stress, increased activity levels in individuals as well as certain medical conditions are manifested by changes in blood flow in the body. Such changes in blood flow cause spectroscopic changes that may be detected according to the methods described above. According to this embodiment, these spectroscopic changes are correlated with oxygenation and/or hemoglobin levels in the blood. In addition to medical uses, the ability to quantify oxygenation levels is useful for individuals in monitoring exercise levels.

Spectroscopic changes associated with different physiological states in human tissue may also result from the release of certain pigments in response to pathological conditions. One example is provided by bilirubin, which is a reddish bile pigment that is released when liver tissue is diseased. The presence of the pigment causes a jaundicing of the affected person's skin. Such changes in skin color may be identified using the methods described above. Accordingly, in one embodiment, an extended functionality of the biometric sensor allows it to function as a bilirubin monitor. In other embodiments, levels of other pigments may similarly be monitored.

The presence of toxic substances in an individual's blood may also manifest itself spectroscopically because of the effect such toxins have on vascularity as well as a direct spectroscopic signature in certain cases. For example, increases in alcohol levels result in spectroscopic changes that may be observed, particularly in the infrared portion of the electromagnetic spectrum. Thus, a further extended functionality of the biometric sensor permits it to function as an alcohol monitor. In other embodiments, the levels of other toxins and/or drugs may be similarly monitored.

While the above examples have focused on uses that correspond to identifying conditions in humans, it will be appreciated that similar spectroscopic information permits the extended functionality also to be used for veterinary purposes. Moreover, spectroscopic information may also be used in quantifying the quality of plant tissues. For example, in one embodiment, the extended functionality comprises use as a fruit-ripeness monitor. Color changes are a natural part of the ripening process for fruit, and these changes may be detected using the methods described above. Accordingly, a portable electronic device that includes a sensor of the type described above may conveniently be used to test the ripeness of fruit.

Spectroscopic information is also of use in characterizing inorganic materials. Thus, in another embodiment, the device may be used for matching the colors of paints, textiles, and other materials. Such information can be used, for example, to match colors of paint and other coatings, or to determine complimentary colors of textiles, clothing, etc. As a further example, ink colors used in documents such as currency and other government documents may be quantified. Comparison of measured spectra for such documents with stored spectral characteristics of approved inks permits the identification of counterfeit documents. Thus, a portable electronic device that includes a sensor of the type described above may be provided with extended functionality as a counterfeit-currency detector.

b. Combined Illumination and Detection Components

In other embodiments, additional extended functionality is provided by using combined illumination and detection capabilities of the biometric sensor. For example, in one embodiment, the device is used as a smart optical switch. In such an embodiment, the ability of the device to identify the liveness of tissue, as described above, is used so that an electronic device is turned on only when touched by living tissue, usually the finger of a person. Such functionality is particularly useful in the context of portable electronic devices, which are often left in purses, briefcases, pockets or other places where they may be activated inadvertently, possibly wasting significant battery life. Such inadvertent activation is avoided by the ability to confirm liveness of an object that touches the switch. As well, the smart switch functionality is applicable to power tools, manufacturing equipment, industrial machinery, and other potentially dangerous environments and conditions. In each of these cases, a smart switch can be used to ensure that the tool, piece of equipment, manufacturing station, etc. was turned on intentionally by a human hand or hands rather than by an accidental touch of an inanimate object. In cases where the smart switch functionality is the sole functionality required of the device, the configuration of the device can be simplified relative to a biometric sensor. More generally, however, the multifunction capabilities, including the smart optical switch, may be included with any implementation of the biometric sensor.

The optical switch may also be configured with trinary functionality in some embodiments. Such functionality may respond to different pressure levels with which a finger presses the optical switch. Such differences in pressure levels affect the optical properties of skin through a variety of physiological phenomena including changes in local tissue perfusion, changes in water volume, and other changes in the optical scattering and absorbance properties of the tissue that are close to the area in contact with the sensor. In general, these changes in the optical properties of the tissue are related to the pressure between the tissue and the sensor, and thereby the pressure can be ascertained optically. Thus, in one embodiment, the trinary functionality corresponds to the three states where (1) the switch is untouched, (2) the switch is touched lightly, and (3) the switch is touched firmly. Still more levels of functionality may be provided, such as where a fourth level corresponds to where the switch is touched with intermediate firmness. In principle, arbitrarily many levels of functionality may be included, although it is generally more difficult for an individual to discriminate levels of firmness if there are more than three or four levels. Since no moving parts are provided for the optical switch, there is no danger that mechanical parts will break or wear. In addition, the absence of mechanical parts makes the switch especially suitable for use with hermetically sealed packages where contamination by air and/or water is to be avoided.

In a further embodiment, the illumination and detection capabilities provided by the biometric sensor are combined to provide an ambient light sensor. In one such embodiment, the level of backlighting on a portable electronic device is adjusted in response to the ambient level of light in order to conserve battery life. For example, the backlight may be increased when the light level is low, such as in a dark room or at night, and decreased when the light level is high, such as during daytime.

In a specific embodiment, the device is configured to discriminate between darkness where the portable electronic device may be used, such as in a dark room or at night, and darkness where the portable electronic device is being stored, such as in a purse or briefcase. These different positions are distinguished by using a reflectance burst when darkness is identified. In a relatively small enclosed space, light is reflected back and detected by the light detector; in such cases, the backlighting is kept very low. In a larger space, such as a room or outdoors, the burst light is not reflected back to the device; accordingly, the backlighting is increased. Alternatively, the ambient sensing capability can be combined with a liveness sensing capability to sense the ambient light level only during or after the sensor has been activated by a genuine sample.

In another embodiment, the combined illumination and detection capabilities are used to provide extended functionality as a bar-code scanner. The bar code scanning capabilities are provided by using the light source to illuminate a bar code and by analyzing the spectrum received by the light detector to deduce the bar code. Such functionality may be used in numerous varied applications, some of which are indicated explicitly herein. For example, in one embodiment, the bar code scanning capability is used to provide an information service. For example, when the sensor is comprised by a portable electronic device that is equipped to access the Internet, scanning of a bar code causes the device to retrieve corresponding information from the Internet and to display the retrieved information on the portable electronic device. Alternatively, certain information may be retrieved directly from a storage device resident on the portable electronic device.

These capabilities permit a user to obtain product information quickly. In some instances, the request for information initiated by the scanning function is additionally recorded for marketing purposes. In particular, the scanning request, coupled with the biometric identification functions of the sensor provide information identifying a person and the type of information being requested. In some cases, this may also be coupled with location information, such as where the portable electronic device includes a GPS transponder. As information requests are made by the user, they may be compiled and subsequently analyzed for directed marketing.

In a particular embodiment, such directed marketing may be substantially contemporaneous with the scanning request. For example, a consumer may be shopping in a grocery store and is trying to decide which of several similar products to purchase. By scanning them to obtain additional information, a remote system may be provided with sufficient information to recognize the consumer's interest. Accordingly, an electronic coupon for a particular one of the products may be immediately directed to the consumer's portable electronic device for immediate use.

Another capability of the bar-code-scanning functionality may be illustrated in the form of a grocery-list compiler. For example, when this capability is enabled in a particular portable electronic device, a simple scan of an item in a household can be made whenever that item is depleted. A record is stored of the fact that the item is now needed, and these records accumulate over time. When the individual is ready to shop for groceries, a simple command on the portable electronic device provides the accumulated shopping list to identify those items for purchase. In an alternative embodiment, items may be added to the list remotely when two portable electronic devices are equipped to communicate with each other. Such an embodiment is useful where a first person is already at the store shopping and a second individual identifies an additional item for purchase. The item is scanned at home and is immediately added to the list at the store.

A further extended functionality that uses the combined illumination and detection capabilities of the sensor permits it to be used as an optical communications port. In such embodiments, the light sources provide encoded optical signals for transmission over short-distance connections. Similarly, the light detectors receive the encoded optical signals from a similarly equipped device. Typical applications for this extended functionality are the ability to use a cellular telephone or PDA as a television remote control and to communicate reprogramming functions to device. In some instances, the light detectors may be configured to respond to certain wavelengths, enabling the implementation of high-bandwidth, full-duplex optical communication.

The functionality of the sensor may also be extended to provide various entertainment functions. For example, in some embodiments, it may be integrated as part of a game provided on a portable electronic device. One aspect of the sensor, in particular, that may be integrated into games is its multiplicity of distinct colors. There are numerous different games that may use such a color feature, one of which is a memory game that requires the player to repeat a color sequence, similar to the game "SIMON." Another game that integrates the functionality of the sensor is an increasingly popular version of "phone tag," in which participants use GPS systems to locate other participants on cellular telephones. Confirmation that a participant has been found may be confirmed by using the biometric sensor described herein. Another entertainment function may use the sensor as a mood meter, providing a description of an individuals mood based on a spectral analysis of her skin.

The functionality of the sensor may also be extended to provide personal-security functions. For example, if the biometric sensor is configured to operate at infrared wavelengths, it may not require actual physical contact in order to perform identifications, but may instead rely on reflected infrared light or even black-body emissions in the infrared region of the electromagnetic spectrum. A variation of this embodiment that provides personal security functions permits the biometric sensor to detect motion at infrared wavelengths. Such a function is useful, for example, for travelers. The motion detection may be integrated with an alarm function so that an alarm is sounded when motion is detected. If the sensor is comprised by a cellular telephone or other portable electronic device, it may alternatively be configured automatically to dial an emergency number.

Another variation of the remote security functionality is offered by configuring the biometric sensor to be sensitive to mid-infrared wavelengths. In this way emitted black-body radiation can be used as the illumination source and the biometric determination can be done remotely, without physically contacting the sensor. In cases where it is desirable to determine that something moved, it is possible to just monitor changes in the amount of reflected or emitted light over time. In other cases where it is important to ensure that the light passes through the skin before being detected (such as a biometric determination), it is also possible to configure a sensor with active illumination to operate remotely by ensuring that the illumination spot and the spot of skin being detected do not overlap. In this way, detected light is ensured to have traveled through the skin rather than simply reflected from the surface. Optical systems for performing such a remote measurement can be developed from lenses, mirrors or other optical elements as know to one of skill in the art.

A further example of a personal-security function that may be provided as part of the extended functionality is a smoke detector. Such a detector may emit light from the light source and be configured to detect light reflected from particles in air as would result from the presence of smoke in a room. Such a feature may also be integrated with an alarm function or with an automatic dial function to respond to presence of smoke.

An additional example of an extended functionality is provided by an optical-strobe function. This function may use the illumination components to produce strobed light and may provide a feedback function based on the detection of reflected light to tune the frequency of the strobe. Such tuning may be applied, for example, to tune strings on musical instruments, such as guitars.

c. Use of Illumination Component

In other embodiments of the invention, extended functionality is provided using only the illumination capabilities provided by the biometric sensor. A simple example that illustrates such extended functionality is a flashlight capability. This capability is achieved simply by activating the light source(s). In some instances, the light source(s) may be configured to be substantially monochromatic and/or to be highly directional, permitting operation as a laser pointer.

More complex extended functionality makes use of the different colors that are available with the light sources. For example, a cellular telephone may use the sensor as an optical ringer, which functions to alert the owner to an incoming call in addition to or instead of by issuing an audible noise. An optical ringer is especially useful in circumstances where an audible ring would be intrusive, such as in a meeting, or would be difficult to detect, such as in a noisy environment. An optical ringer may also be used by people having a hearing impairment, who may nevertheless use short message services ("SMS") that are available for cellular telephones. The color capability is used in certain embodiments to identify the caller by correlating the originating telephone number with a predefined color. Also, in certain embodiments, particular optical-ring patterns may be downloadable.

According to embodiments of the invention, specific sequences of colors may also be presented with the sensor as a form of branding to identify a product or service source. For example, in response to identifying an individual, a distinct temporal sequence of colors may be presented with the light sources. If the sensor is comprised by a product, such as a portable electronic device, the temporal sequence may be associated with the manufacturer of the product. If the sensor is positioned for use as part of a security screening system, such as in an airport, the temporal sequence may be associated with a security company that manages the screening system.

While the use of a temporal sequence of colors may be implemented with one of the sensor arrangements described above, the invention is not limited to such an implementation. More generally, embodiments of the invention include the broad use of any temporal sequence of colors as an identifier of a product or service source. In some embodiments, such a temporal sequence of colors may additionally be coupled with a temporal sequence of sounds. The combination of the temporal sequences of colors and sounds effectively provides a brief musical light show that serves a branding function.

d. Use of Optical Detection Component

In addition to embodiments where the extended functionality of the biometric sensor is provided with only the illumination component, the extended functionality may also be provided with only the optical detection component of the sensor in other embodiments. In one such embodiment, the light detector comprised by the sensor is used as a light meter to quantify light levels. There are a number of applications for such a light meter that are within the scope of the invention, including use in photography applications, in opthalmology applications, and as a meter for quantifying sun exposure, among others.

The collection of light with the detector also provides a means for collecting a small amount of energy from impinging photons. In such embodiments, the detector effective functions as a trickle charger when it is not in active use for identification and verification functions. The available of such trickle charging is especially useful in applications where battery lifetime is a paramount concern, notably in portable electronic devices such as cellular telephones. When the biometric sensor is incorporated into such a portable electronic device, its impact on battery lifetime is substantially mitigated by the use of trickle charging to recover battery lifetime that might be used in operating the sensor.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A device comprising:
   a plurality of light sources, wherein at least two of the plurality of light sources provide light with distinct wavelengths;
   a light detector, wherein the distance between the light detector and at least one of the plurality of light sources is different than the distance between the light detector and another of the plurality of the light sources; and
   a processor configured to operate the light sources and the light detector to perform a plurality of distinct functions,
   wherein at least one of the distinct functions comprises a biometric identification function comprising:
      propagating light from the plurality of light sources into presented material, and diffusely reflecting the propagated light toward the light detector;
      receiving the diffusely reflected light with the light detector; and
      identifying the presented material from the received light based on the wavelength characteristics of the received light and the distance between the source and the detector; and
   wherein another of the distinct functions comprises a nonidentification function performed with the light sources and the light detector.

2. The device recited in claim 1 wherein the light detector comprises a plurality of light detectors.

3. The device recited in claim 2 wherein the plurality of light detectors comprises an array of light detectors.

4. The device recited in claim 1 wherein the nonidentification function comprises a liveness function to determine whether the presented material is alive.

5. The device recited in claim 4 wherein the nonidentification function comprises operation of an optical switch having multistate functionality.

6. The device recited in claim 1 wherein the nonidentification function comprises a nonbiometric function.

7. The device recited in claim 6 wherein the nonidentification function comprises operation of an optical communications port with the light sources and the light detector.

8. A portable electronic device comprising:
- an electronic arrangement for performing a standard function of the portable electronic device;
- a biometric sensor having:
  - a plurality of light sources, wherein at least two of the plurality of light sources provide light at distinct wavelengths; and
  - a light detector disposed relative to the light sources to detect light from the light sources that has propagated through tissue, wherein the distance between the light detector and at least one of the plurality of light sources is different than the distance between the light detector and another of the plurality of the light sources; and
- a processor configured to operate the electronic arrangement to perform the standard function and to operate the biometric sensor in accordance with the following:
  - propagating light from the plurality of light sources into presented material, and diffusely reflecting the light toward the light detector;
  - receiving the diffusely reflected light with the light detector; and
  - identifying the presented material from the received light based on the wavelength characteristics of the received light and the distance between the source and the detector.

9. The portable electronic device recited in claim 8 wherein the electronic arrangement performs functions of a device selected from the group consisting of a cellular telephone, a personal digital assistant, an electronic fob, and a watch.

10. The portable electronic device recited in claim 8 wherein the processor is further configured to operate the biometric sensor to perform a nonbiometric function.

11. The portable electronic device recited in claim 10 wherein the nonbiometric function comprises a spectrometer function.

12. The portable electronic device recited in claim 11 wherein the spectrometer function is selected from the group consisting of a stress-detection function, a lie-detector function, a tanning-meter function, a complexion-monitor function, a toxicity-monitor function, an alcohol-monitor function, a bilirubin-monitor function, a hemoglobin-monitor function, a fruit-ripeness-monitor function, a counterfeit-document detection function, and a color-match function.

13. The portable electronic device recited in claim 10 wherein the nonbiometric function uses an illumination capacity of the plurality of light sources and uses a detection capacity of the light detector.

14. The portable electronic device recited in claim 13 wherein the nonbiometric function is selected from the group consisting of an ambient-light-sensor function, an entertainment function, a personal-security function, a smoke-detector function, a motion-detection function, and an optical-strobe function.

15. The portable electronic device recited in claim 10 wherein the nonbiometric function uses an illumination capacity of the plurality of light sources.

16. The portable electronic device recited in claim 15 wherein the nonbiometric function is selected from the group consisting of an optical-ringer function, a flashlight function, and a laser-pointer function.

17. The portable electronic device recited in claim 10 wherein the nonbiometric function uses a detection capacity of the light detector.

18. The portable electronic device recited in claim 17 wherein the nonbiometric function is selected from the group consisting of a trickle-charger function and a light-meter function.

19. A device for performing a biometric function for presented material, the device comprising:
- a plurality of light sources arranged on a first side of the device, wherein at least two of the plurality of light sources provide light at distinct wavelengths;
- at least one light detector arranged on the first side of the device, wherein the distance between the light detector and at least one of the plurality of light sources is different than the distance between the light detector and another of the plurality of the light sources; and
- a processor configured to operate the light sources and the light detector to perform at least a first function and a second function,
- wherein first function comprises a biometric identification function comprising:
  - propagating light from the plurality of light sources toward the presented material;
  - diffusely reflecting the propagated light from the presented material toward the light detector;
  - receiving the diffusely reflected light with the light detector; and
  - identifying the presented material from the received light based on the wavelength characteristics of the received light and the distance between the source and the detector; and
- wherein the second function comprises a nonidentification function performed with the light sources and the light detector.

* * * * *

UNITED STATES PATENT AND TRADEMARK OFFICE
CERTIFICATE OF CORRECTION

| | | |
|---|---|---|
| PATENT NO. | : 7,620,212 B1 | Page 1 of 1 |
| APPLICATION NO. | : 10/640503 | |
| DATED | : November 17, 2009 | |
| INVENTOR(S) | : Jeffrey G. Allen et al. | |

It is certified that error appears in the above-identified patent and that said Letters Patent is hereby corrected as shown below:

Column 24, line 5, delete "opthalmology" and insert --ophthalmology--

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,620,212 B1 |
| APPLICATION NO. | : 10/640503 |
| DATED | : November 17, 2009 |
| INVENTOR(S) | : Allen et al. |

It is certified that error appears in the above-identified patent and that said Letters Patent is hereby corrected as shown below:

Title Page, Item [*]

Delete the phrase "by 963 days" and insert -- by 1631 days --.

Signed and Sealed this

Thirty-first Day of August, 2010

David J. Kappos
*Director of the United States Patent and Trademark Office*